United States Patent
Mukundan et al.

(10) Patent No.: US 12,495,228 B2
(45) Date of Patent: Dec. 9, 2025

(54) DEVICE AND METHOD FOR PERFORMING READOUT OF A PIXEL ARRAY IN ROLLING SHUTTER IMAGE SENSOR

(71) Applicant: SAMSUNG ELECTRONICS CO., LTD., Suwon-si (KR)

(72) Inventors: Akshaya A Mukundan, Bengaluru (IN); Vishwanath Vijaykumar Hiremath, Bengaluru (IN); Prashant Govindlal Rupapara, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 70 days.

(21) Appl. No.: 18/625,481

(22) Filed: Apr. 3, 2024

(65) Prior Publication Data

US 2024/0340556 A1 Oct. 10, 2024

(30) Foreign Application Priority Data

Apr. 10, 2023 (IN) .......................... P202341026627
Mar. 7, 2024 (IN) ............................ 202341026627

(51) Int. Cl.
*H04N 25/78* (2023.01)
*H04N 25/531* (2023.01)

(52) U.S. Cl.
CPC .......... *H04N 25/78* (2023.01); *H04N 25/531* (2023.01)

(58) Field of Classification Search
None
See application file for complete search history.

(56) References Cited

U.S. PATENT DOCUMENTS

| | | | |
|---|---|---|---|
| 4,814,865 A * | 3/1989 | Tabei ................. | H04N 25/11 348/E9.01 |
| 9,628,729 B2 | 4/2017 | Makino et al. | |
| 9,995,920 B2 | 6/2018 | Ito et al. | |
| 10,542,231 B2 | 1/2020 | Shikina et al. | |
| 10,616,509 B2 | 4/2020 | Seki et al. | |
| 10,666,889 B2 | 5/2020 | Hirata | |
| 11,330,221 B1 | 5/2022 | Ma | |
| 2011/0176045 A1 | 7/2011 | Ahn et al. | |
| 2014/0225998 A1 | 8/2014 | Dai et al. | |
| 2015/0296159 A1 | 10/2015 | Mansoorian et al. | |
| 2022/0132066 A1 * | 4/2022 | Ma ...................... | H04N 25/46 |
| 2022/0303487 A1 | 9/2022 | Ma | |

FOREIGN PATENT DOCUMENTS

JP 2016187071 10/2016

* cited by examiner

*Primary Examiner* — Mark T Monk
(74) *Attorney, Agent, or Firm* — Morgan, Lewis & Bockius LLP

(57) ABSTRACT

Disclosed is a method of performing readout of pixel array that includes reading, when a first condition is detected, pixels of a first half and a second half of FD nodes sharing a common Vout line in monotonically increasing and decreasing row orders, respectively. When a second condition is detected, pixels of (Gr, R) rows and (B, Gb) rows connected to different Vout lines are read in opposite respective directions in a first phase and a second phase, respectively. When a third condition is detected, first and second color pixels from first and second Vout lines are read out at each readout instance. When a fourth condition is detected, pixels are read out from even rows of a first half of rows, odd rows of a second half of rows, odd rows of the first half of rows, and even rows of the second half of rows.

16 Claims, 22 Drawing Sheets

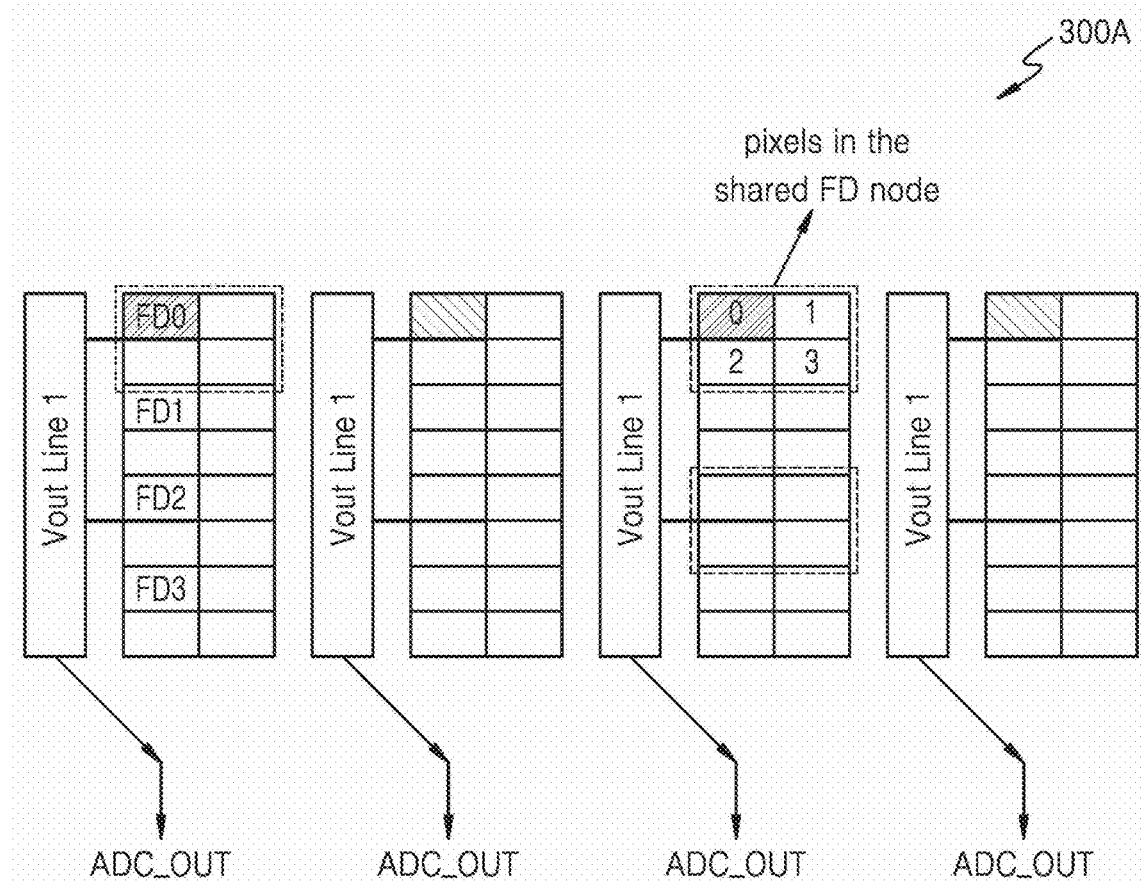

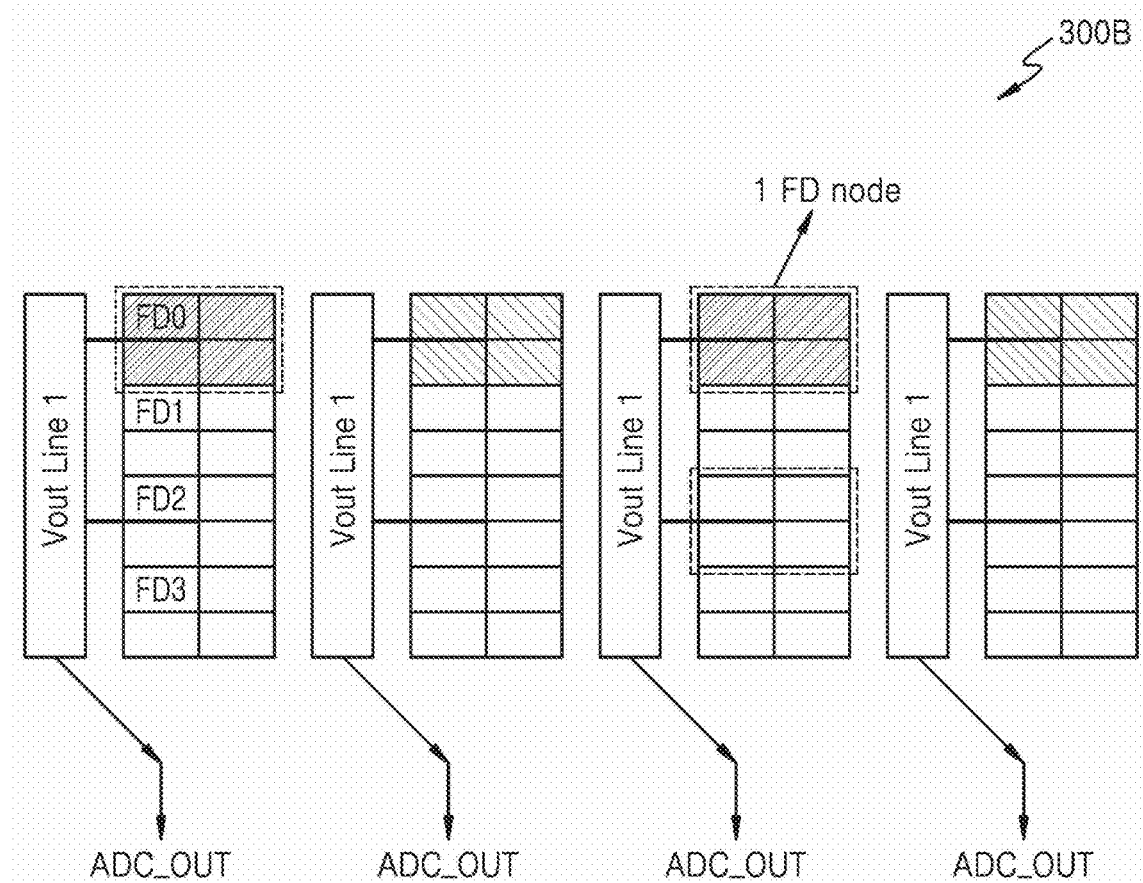

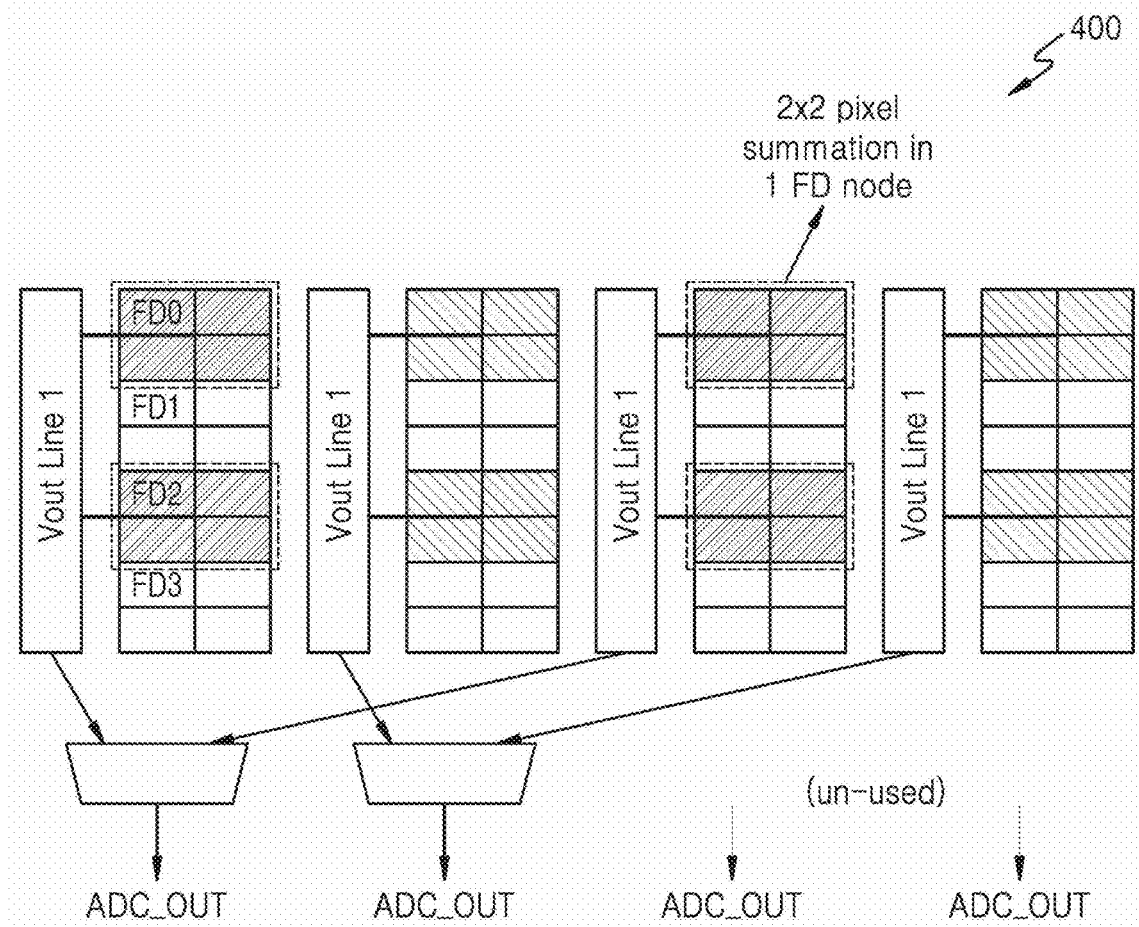

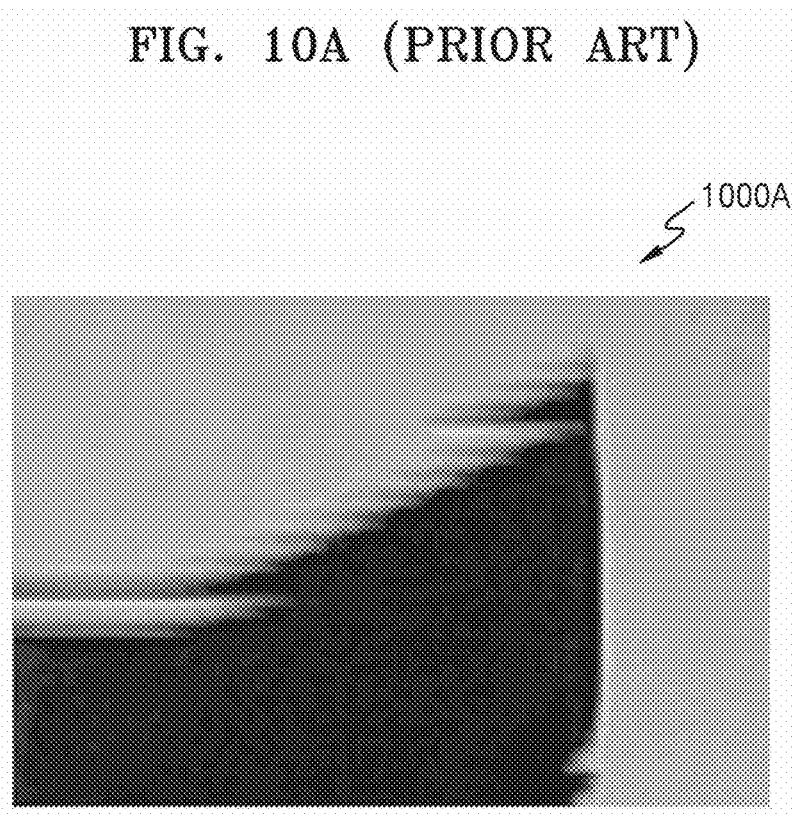

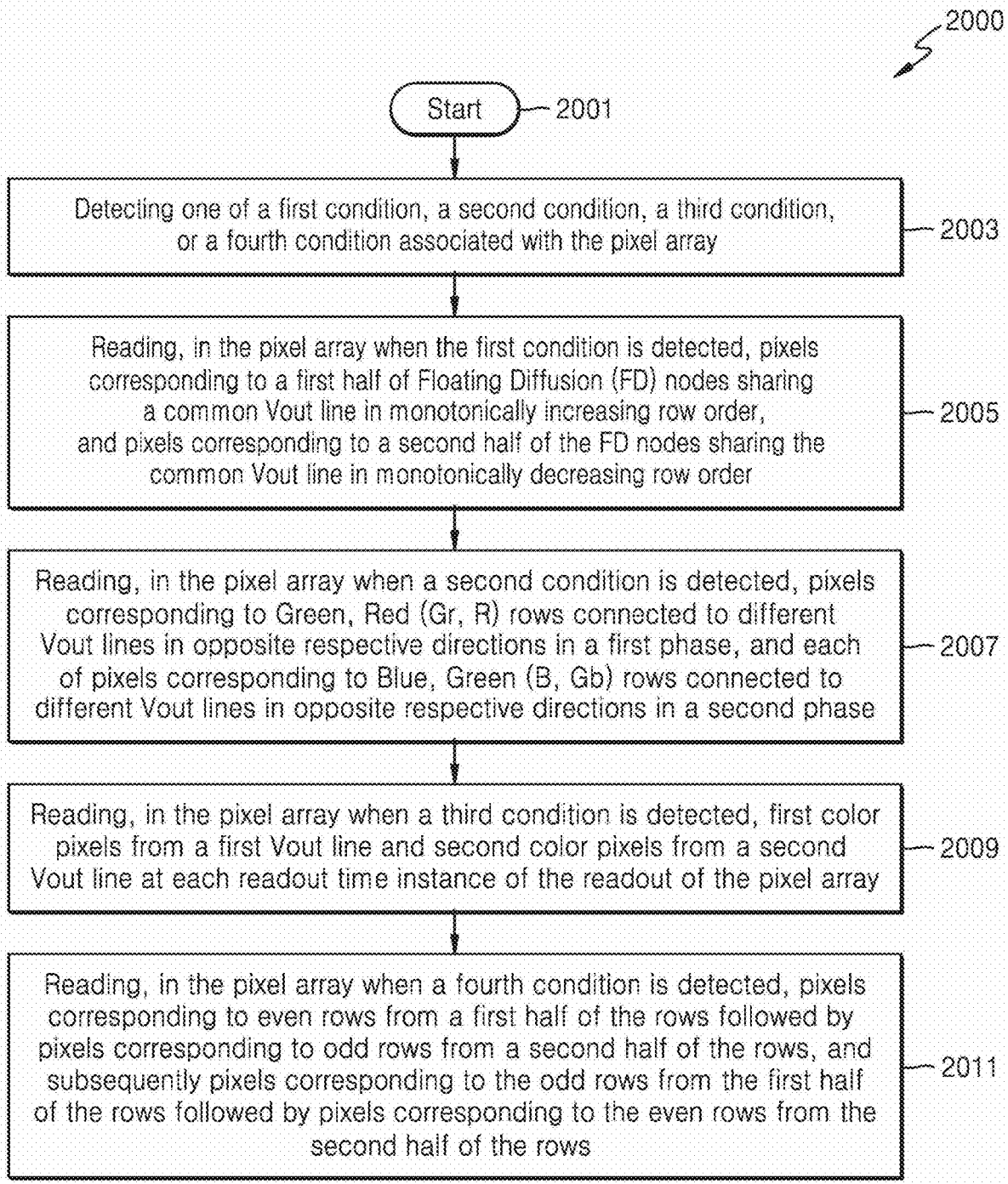

DEVICE AND METHOD FOR PERFORMING READOUT OF A PIXEL ARRAY IN ROLLING SHUTTER IMAGE SENSOR

CROSS REFERENCE TO RELATED APPLICATION(S)

This application claims priority to Indian Provisional Application No. 202341026627, filed Apr. 10, 2023 and Indian patent application Ser. No. 202341026627, filed Mar. 7, 2024, in the Indian Patent Office, the contents of which are incorporated herein by reference in their entireties.

TECHNICAL FIELD

The present disclosure relates generally to the field of image processing, and more specifically relates to a device and a method for performing readout of a pixel array in a rolling shutter image sensor.

DISCUSSION OF RELATED ART

A rolling shutter-based camera uses a rolling shutter image sensor to capture an image. The image is captured by sequentially scanning the rolling shutter image sensor from top to bottom or from left to right, one row or column at a time. This sequential scanning is called a pixel array readout in the rolling shutter image sensor. The rolling shutter image sensor captures the image in small sections, with each section being exposed for a brief period. The exposure time for each section is determined by the camera's shutter speed, which is the amount of time the shutter is open during the exposure. As a result, each row or column of the image is exposed at a slightly different time, depending on where the row or column is located on the sensor.

In conventional techniques, a floating diffusion (FD) node is used in readout stage to capture the charges from pixels. Typically, pixel sharing is used in the FD node in the readout stage for an efficient readout process. There are several combinations in which the pixel sharing can be achieved in the readout of the FD node. Examples of such combinations may include but not limited to, a pixel configuration of 1×1, 2×2, 2×4, etc. For instance, FIG. 1 illustrates a schematic diagram of a "1-photodiode floating diffusion (PD FD) node" for pixel array readout in the rolling shutter image sensor, in accordance with existing art. The 1-PD FD node includes a photodiode 101, a transfer gate (TG) 103, a reset gate (RG) 105, and a FD node 107. In the 1-PD FD node readout, the photodiode 101 collects charge from light that falls on each pixel. The TG gate 103, when enabled, transfers the collected charge to the FD node 107. The FD node 107 converts the charge to a voltage signal (Vout). The RG gate 105 resets the FD node 107 before sampling the collected charge.

FIG. 2 is a schematic diagram of a "2×2 FD node" 200 for pixel array readout in the rolling shutter image sensor, in accordance with existing art. In the 2×2 FD node readout, four adjacent pixels are grouped by connecting their photodiodes to a common node (not shown, illustrated schematically with the dashed lines). This common node is then connected to a single FD node 207, which converts the combined charge from the four pixels into the voltage signal. The FD node 207 corresponds to the FD node 107 of FIG. 1. The 2×2 FD node readout includes a full mode and a 4 FD sum mode. In the full mode, the signals from all four pixels are read out individually through the same FD node 207. To read out the signal from an individual pixel, the TG gate corresponding to the individual pixel is enabled and the remaining TG gates are disabled so that the charge accumulated in the individual pixel gets transferred to the single FD node 207. In the 4 FD sum mode, the signals from the four pixels are combined and summed before being read out through the single FD node 207. To read out the signal from all four pixels, the TG gates of all four pixels are enabled together so that the collected charge from four pixels gets transferred to the single FD node 207. FIG. 3A illustrates a diagram 300A depicting a readout of pixels in the full mode in the 2×2 FD node, in accordance with existing art. FIG. 3B illustrates a diagram 300B depicting a readout of pixels in the 4 FD sum mode in the 2×2 FD node, in accordance with existing art.

In one conventional technique, a binning mode is used in the 2×2 FD node to increase the signal-to-noise ratio (SNR) of the image by combining signals from adjacent pixels. A 4 FD sum mode plus horizontal-2 and vertical-2 (H2V2) binning mode is a technique used in some 2×2 FD node readout of rolling shutter image sensors to further improve image quality and reduce noise. 4 FD sum mode plus H2V2 binning mode combines the benefits of the 4 FD sum mode, where adjacent pixels are combined and summed, with the benefits of the H2V2 binning mode, where pixels are grouped in a 2×2 binning mode to further increase signal-to-noise ratio (SNR) and reduce noise (but at the expense of reduced resolution).

FIG. 4 illustrates a diagram 400 depicting a readout of pixels in 4 FD sum mode plus H2V2 binning mode, in accordance with existing art. As illustrated in FIG. 4, in 4 FD sum mode plus H2V2 binning mode, adjacent 2×2 groups of pixels are combined and then binned in a 2×2 pattern, resulting in a single output pixel (ADC_OUT) for each 2×2 group of pixels. A charge from two FD summed pixels (FD0 and FD2) (of the same color) is passed to one output line (Vout Line 1) resulting in "vertical 2" (V2) binning. Then, charge from two columns Vout of a same color pixel is multiplexed for "horizontal 2" (H2) binning. In the V2 binning, since the charges are passed through a common line (Vout Line 1), the charges are averaged. Further, in the H2 binning, resultant charges are further averaged. Further, as shown in FIG. 4, in H2V2 binning mode two analog-to-digital converters (ADCs) are unused.

To utilize the idle ADCs, a reading from different vertically spaced rows is also performed. Since the two rows are simultaneously being read, this method is called 2-row simultaneous readout (2RSR). FIG. 5 illustrates a diagram 500 depicting the readout of pixels in 2RSR mode, in accordance with existing art. The 2RSR mode is used in 2×2 FD node readout rolling shutter image sensors for a higher ADC utilization efficiency and frame rate per second (FPS) compared to the 2×2 binning mode. In 2RSR mode, two rows of pixels throughout the width of the pixel array are combined and read out simultaneously.

Further, FIG. 6 illustrates a diagram 600 depicting a scenario of Dual Conversion Gain (DCG) capability for a 2×2 group of pixels. In the shared pixel array, adjacent FD nodes share a common Conversion Gain (CG) node. Each FD node has a capacitance value. The capacitance value will be higher if only one FD node is active at a time. As shown in FIG. 6, the nodes FD0 and the FD1 share a common conversion gain node (CG0). To have a higher capacitance value or to use the DCG capability feature, nodes FD0 and FD1 should not be active simultaneously. Therefore, the DCG capability requires farther spaced (i.e., more vertically spaced) simultaneous row access.

Further, FIG. 7 illustrates a diagram 700 depicting a comparison of the DCG capability for a 2×2 group of pixels and a 2×4 group of pixels in 2RSR full mode. As shown in FIG. 7, for the 2×2 group of pixels in the 2RSR full mode (left side diagram), to use the DCG capability feature, FD0 and FD1 cannot be read simultaneously. Further, in binning mode, same color pixels in FD0 and FD2 are binned together. Therefore, after reading an initial row ($0^{th}$ row) the next readout will be for the $8^{th}$ row. Further, for the 2×4 group of pixels in the 2RSR full mode, to use the DCG capability feature, FD0 and FD1 cannot be read simultaneously. Therefore, in the 2×4 group of pixels, after reading an initial row ($0^{th}$ row), the next readout will be for the $16^{th}$ row. Accordingly, in the 2×4 group of pixels, the DCG feature requires farther spaced simultaneous row access. However, as the simultaneous row access becomes farther spaced, the image breakup artifact in moving object images becomes more prominent and results in degradation in image quality.

Further, a readout architecture may be drawn for a Bayer pixel array arrangement and a Tetra pixel array arrangement. The Bayer pixel array comprises a grid of pixels where each pixel only captures one of three primary colors red, green, or blue (RGB). The pixels are arranged in a checkerboard pattern where every other row and column captures green pixels, while the remaining pixels capture either red or blue. The Tetra pixel array is also known as Quad Bayer or 2×2 pixel binning. The Tetra pixel array comprises a grid of pixels where each pixel is composed of four smaller sub-pixels, each of which captures a different primary color (two green, one red, and one blue). The sub-pixels are arranged in a 2×2 pattern and the signal from each group of four sub-pixels is combined to produce a full-color pixel. This arrangement can capture more color information than the Bayer pixel array and can also improve low-light performance by combining the signals from adjacent sub-pixels to increase sensitivity.

FIG. 8 illustrates a diagram 800 depicting a conventional readout architecture for the Bayer pixel array, in 2RSR mode, in accordance with existing art. FIG. 9 illustrates a diagram 900 depicting a conventional readout architecture for Tetra pixel array, in 2RSR mode, in accordance with existing art.

In the conventional readout architecture, the FD nodes which share a common Vout line are read in monotonically increasing row order. In the Bayer pixel array as shown in FIG. 8, the $0^{th}$ row and the $8^{th}$ row are read together. Therefore, a row read time difference between the 7th and 8th row readout is a worst (longest) row read time difference for the Bayer pixel array in the conventional readout architecture. Further, in the Tetra pixel array as shown in FIG. 9, the $0^{th}$ row and the $16^{th}$ row are read together. The row read time difference between the 15th and 16th row readout is the worst row read time difference for the Tetra pixel array in the conventional readout architecture. The worst row read time difference may be used to decide whether or not an object's movement while capturing the object will have an impact on the final image.

Each of the above-mentioned readout modes results in reduced spatial resolution and potential loss of image detail. The nRSR mode has the worst row read time difference between adjacent green pixel rows in any pixel array structure. Also, the worst read time difference between the adjacent green pixel rows is different for different pixel array structures. This results in image stagnation and/or a flicker effect during the capture of moving objects. Further, when the camera or object is in motion, the rolling shutter image sensor can result in distortion or warping of the image. This distortion is called the "Jello effect" or "rolling shutter distortion." The Jello effect may be an unavoidable effect in existing rolling shutter image sensors, whereas the image stagnation is an undesired artifact due to nRSR readout. FIGS. 10A and 10B illustrate diagrams 1000A and 1000B depicting distortion in an output image of the rolling shutter image sensor due to the Jello effect and the image stagnation, respectively, in accordance with existing art.

The undesired effects of image stagnation and flicker become more significant in conventional techniques due to the stair-shaped readout which leads to a sudden large difference in an adjacent row access time after every Vout line, as illustrated in FIG. 8.

In the conventional readout techniques, serial readout of all pixels in the shared floating diffusion node of any size leads to a corresponding minimum integration time. In a typical example, the minimum integration time ("minCIT" throughout the drawings) for the 2×2 FD node may correspond to 4 units of ADC conversion time ("4H") (4× the time allocated/needed for an ADC conversion of the voltage on a Vout line).

To reduce or eliminate the image stagnation and the staircase like artifacts, pixel array readout schemes may use additional dummy line readout from the pixel array. However, the use of an additional dummy line readout from the pixel array demands an increase in the pixel array size. It also impacts the overall frame rate per second (FPS) because of dummy access time. Further, the readout would also require a higher minimum integration time.

Hence, there is a need to provide techniques that can overcome the above-discussed problems.

SUMMARY

In an embodiment, a method of performing readout of a pixel array in a rolling shutter image sensor is disclosed. The method includes detecting one of first through fourth conditions associated with the pixel array. When the first condition is detected, pixels corresponding to a first half of Floating Diffusion (FD) nodes sharing a common Vout line are read in monotonically increasing row order, and pixels corresponding to a second half of the FD nodes sharing the common Vout line are read in monotonically decreasing row order. When the second condition is detected, pixels corresponding to Green, Red (Gr, R) rows and connected to different Vout lines are read in opposite respective directions in a first phase, and pixels corresponding to Blue, Green (B, Gb) rows and connected to different Vout lines are read in opposite respective directions in a second phase. When the third condition is detected, first color pixels from a first Vout line and second color pixels from a second Vout line are read at each readout time instance of the readout of the pixel array. When the fourth condition is detected, pixels corresponding to even rows from a first half of the rows, followed by pixels corresponding to odd rows from a second half of the rows, are read, and subsequently pixels corresponding to the odd rows from the first half of the rows followed by pixels corresponding to the even rows from the second half of the rows, are read, wherein the first half of the rows and the second half of the rows have shared FD nodes.

In one or more embodiments, the first condition indicates that an integration time associated with the readout of the pixel array equals or exceeds a predefined threshold integration time.

In one or more embodiments, the predefined threshold integration time corresponds to a minimum integration time associated with the readout of the pixel array.

In one or more embodiments, the second condition indicates that an Analog-to-Digital (ADC) conversion time associated with the readout of the pixel array supports simultaneous row access in the readout of the pixel array, and a distance between a set of rows accessed in the simultaneous row access is variable.

In one or more embodiments, the third condition indicates that the readout of the pixel array supports simultaneous readout of the first color pixels and the second color pixels from different rows of the pixel array.

In one or more embodiments, the fourth condition indicates that a plurality of rows of the pixel array is accessible at a predefined distance.

In one or more embodiments, the first color pixels correspond to Green (Gr/Gb) pixels and the second color pixels correspond to one of Red (R) or Blue (B) pixels.

In one or more embodiments, the method further includes monotonically reading pixels successive vertical addresses of the Green (Gr/Gb) pixels in the pixel array.

Also disclosed herein is a device including a rolling shutter image sensor and readout circuitry. The rolling shutter image sensor includes a pixel array. The readout circuitry is configured to detect one of first through fourth conditions associated with the pixel array. When any of the first through fourth conditions is detected, the readout circuitry performs a corresponding one of the above-summarized first through fourth reading operations of the method delineated above.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIGS. 3A and 3B illustrate a diagram depicting a readout of pixels in the full mode and in the 4 FD sum mode in the 2×2 FD node, in accordance with existing art;

FIG. 4 illustrates a diagram depicting readout of pixels in 4 FD sum mode plus H2V2 binning mode, in accordance with existing art;

FIGS. 10A and 10B are diagrams depicting distortion in an output image of the rolling shutter image sensor due to the Jello effect and image stagnation, respectively, in accordance with existing art;

FIG. 20 illustrates a flow chart of a method of performing readout of a pixel array in a rolling shutter image sensor, according to one or more embodiments disclosed herein.

Figure 1:
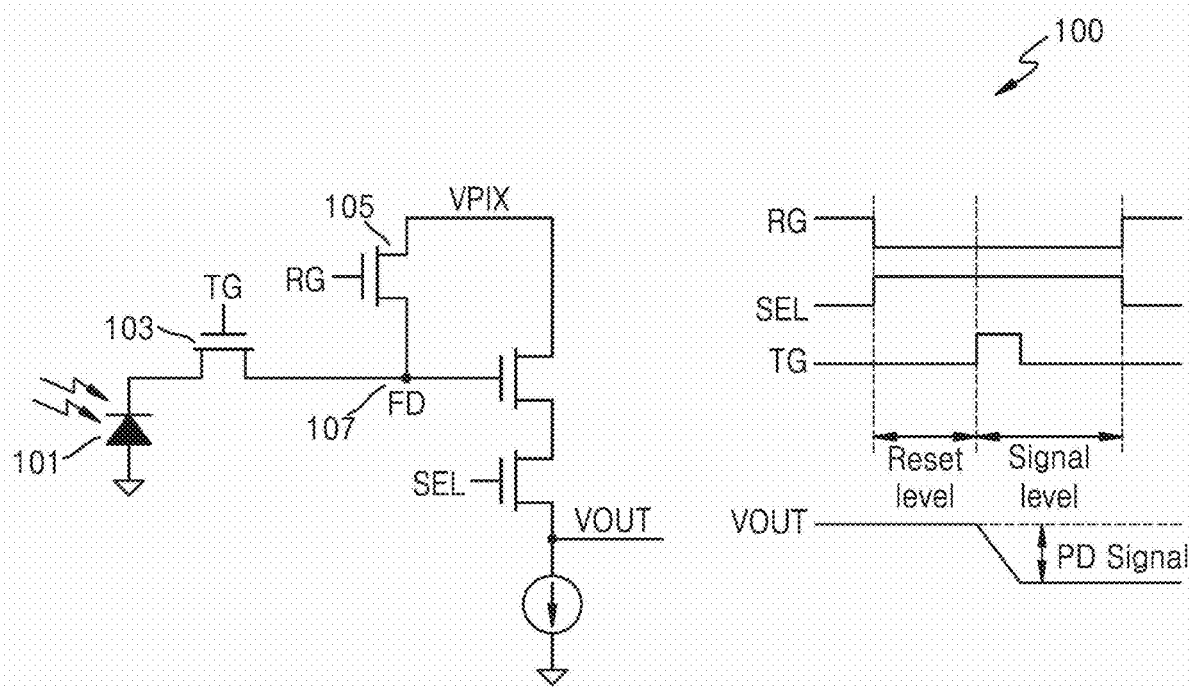
FIG. 1 illustrates a schematic diagram of 1 PD FD node for pixel array readout in the rolling shutter image sensor, in accordance with existing art.
Figure 2:
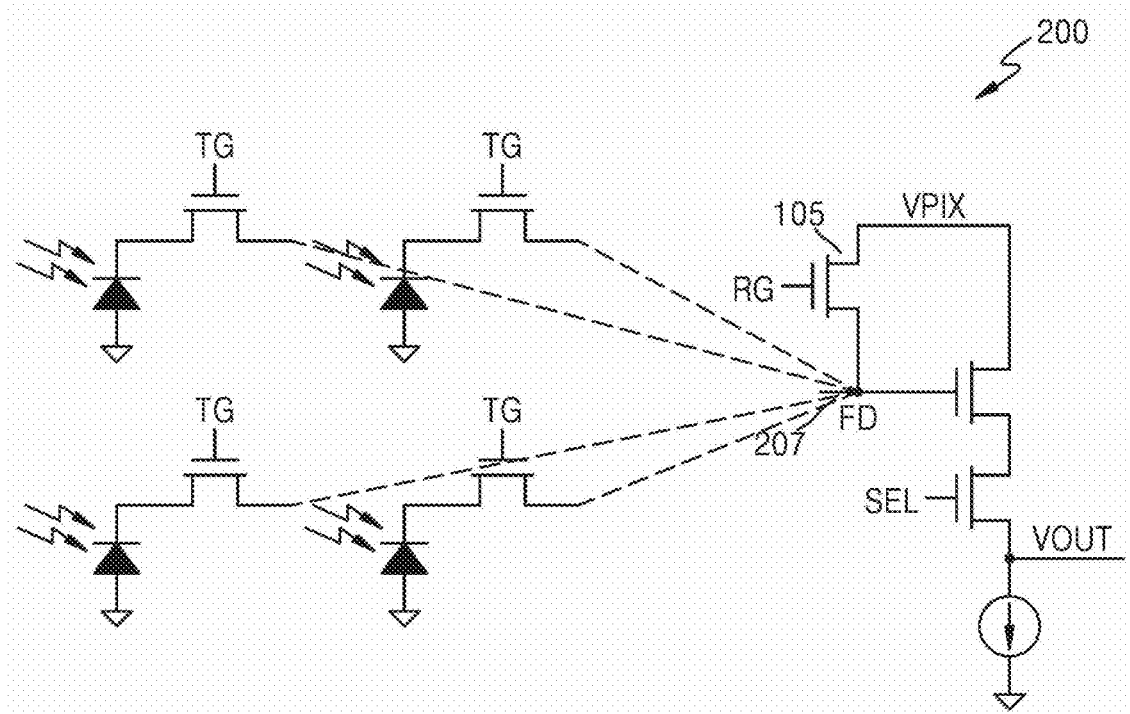
FIG. 2 illustrates a schematic diagram of 2×2 FD node for pixel array readout in the rolling shutter image sensor, in accordance with existing art.
Figure 5:
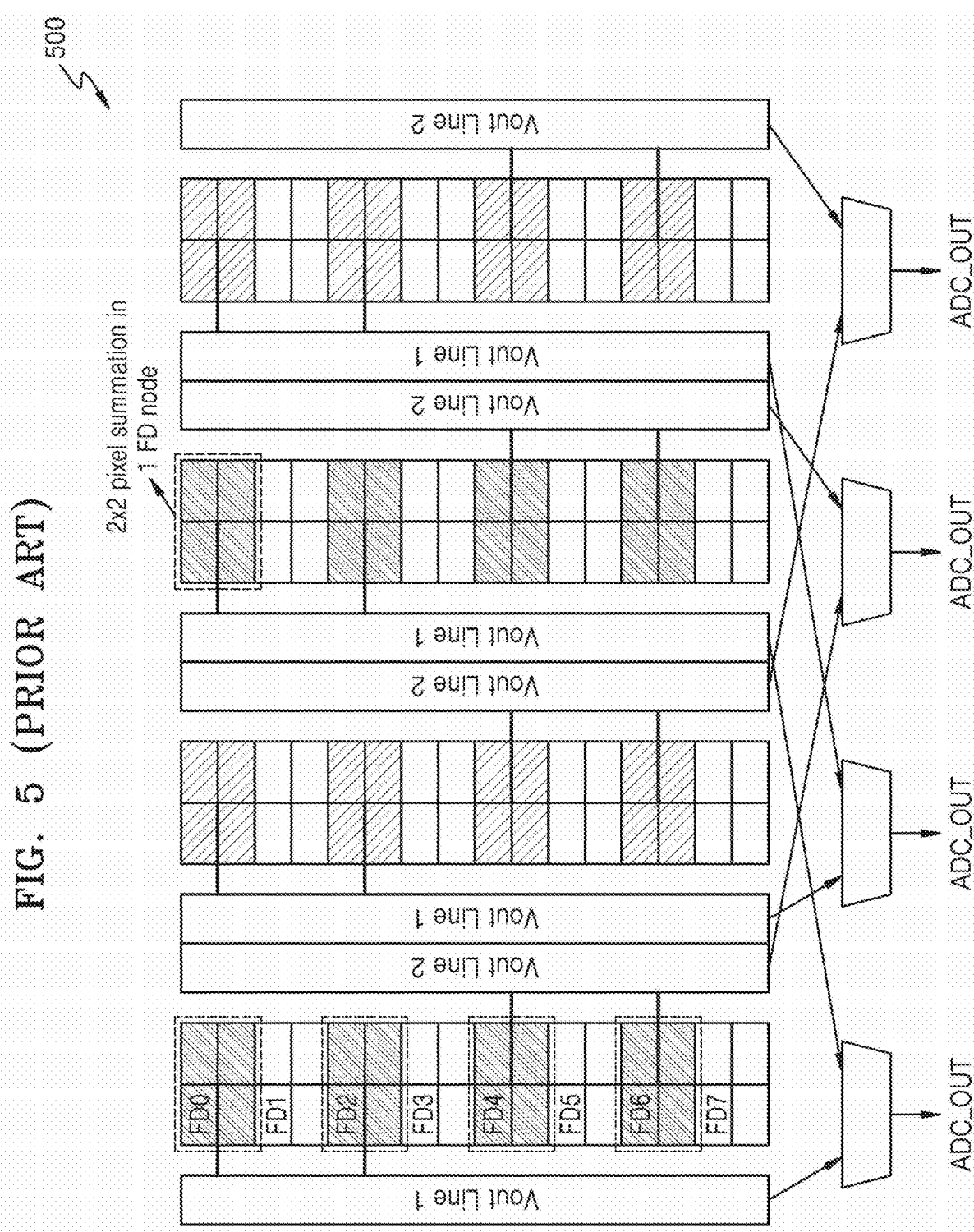
FIG. 5 illustrates a diagram depicting readout of pixels in 2RSR mode, in accordance with existing art.
Figure 6:
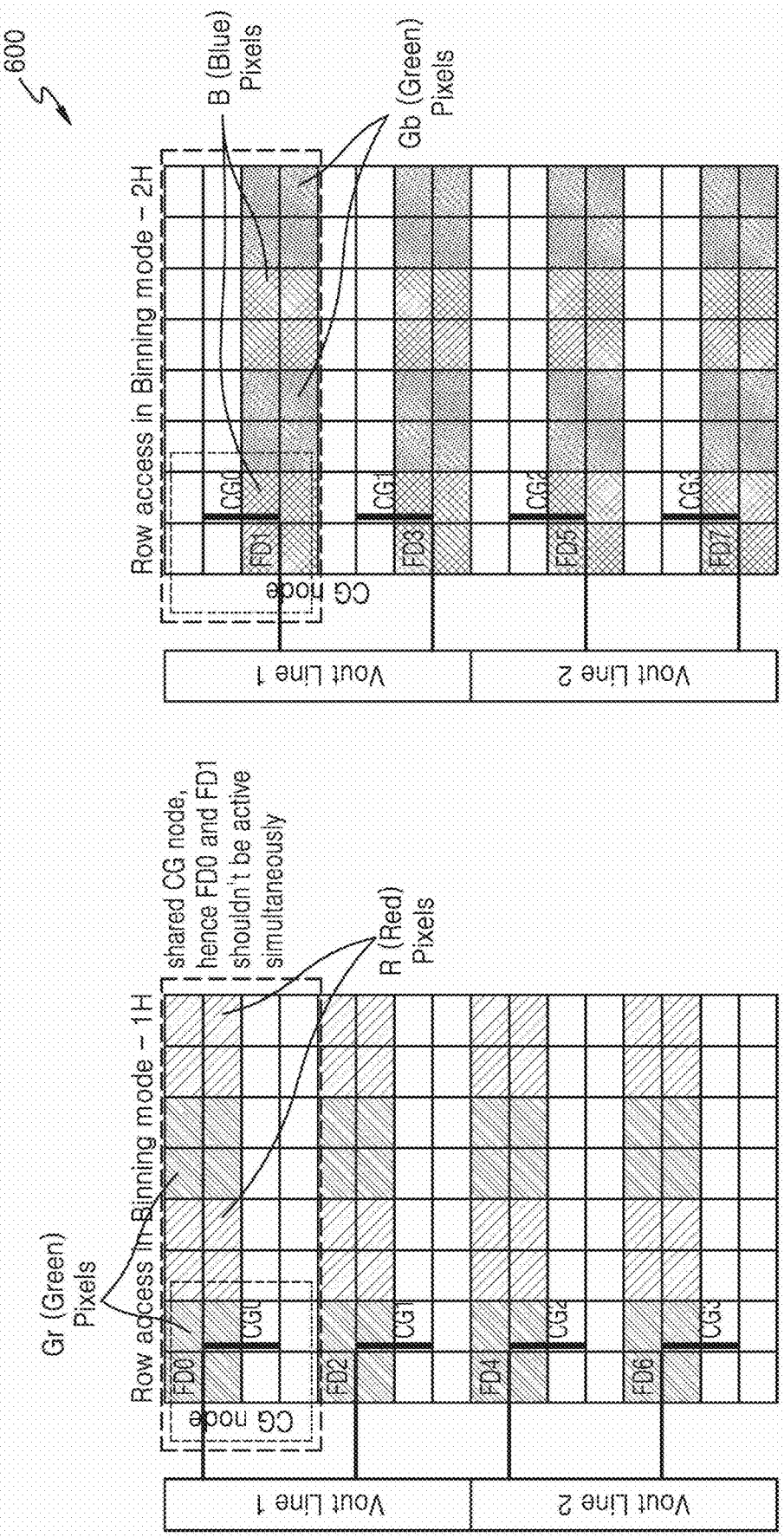
FIG. 6 illustrates a diagram depicting a scenario of Dual Conversion Gain (DCG) capability for a 2×2 group of pixels, in accordance with existing art.
Figure 7:
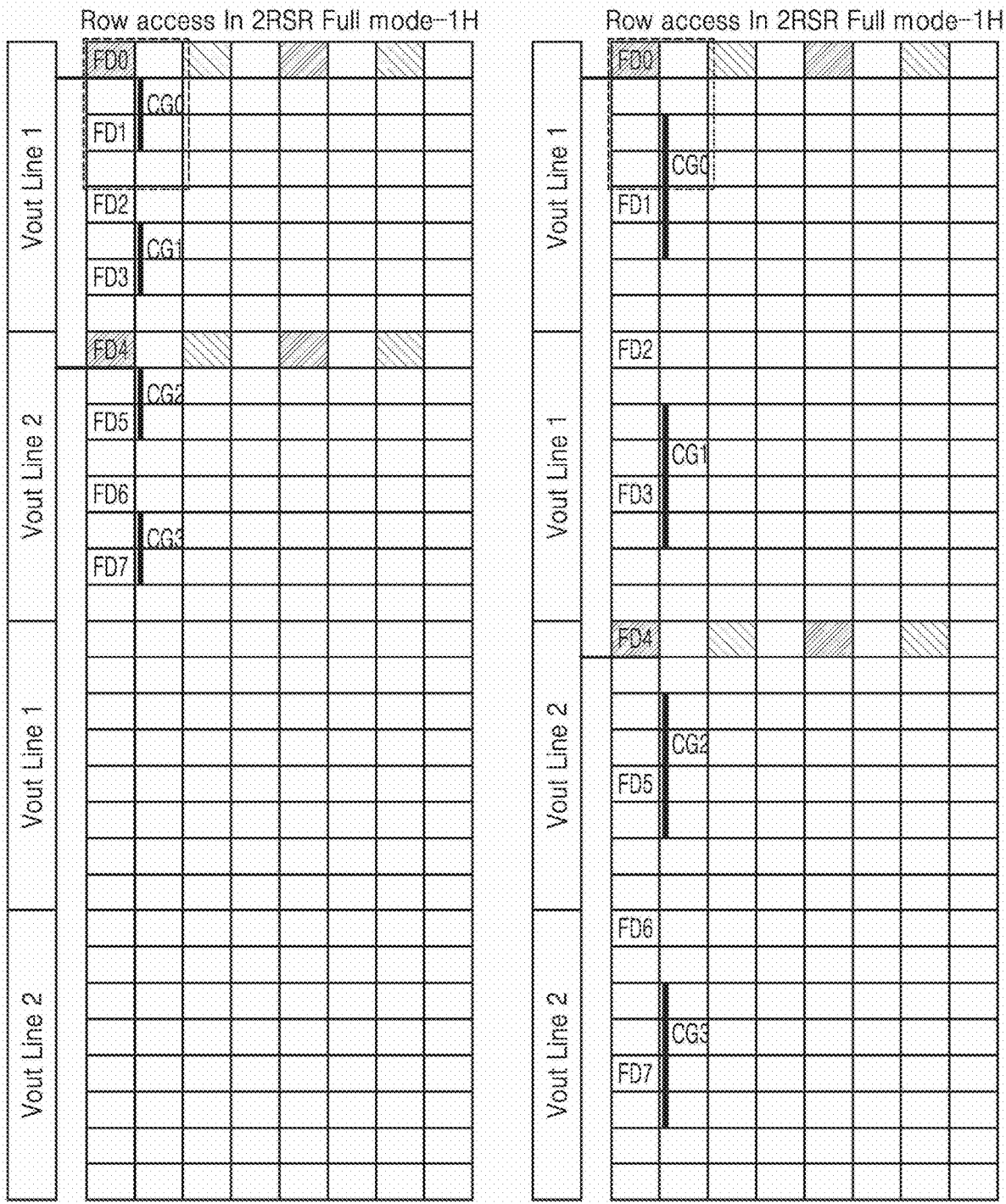
FIG. 7 illustrates a diagram depicting a comparison of the DCG capability for the 2×2 group of pixels and the 2×4 group of pixels in 2RSR full mode, in accordance with existing art.

Further, skilled artisans will appreciate that those elements in the drawings are illustrated for simplicity and may not have necessarily been drawn to scale. For example, the flow charts illustrate the method in terms of the most prominent operations involved to help to improve understanding of aspects of the present inventive concepts. Furthermore, in terms of the construction of the device, one or more components of the device may have been represented in the drawings by conventional symbols, and the drawings may show only those specific details that are pertinent to understanding the embodiments of the present inventive concepts so as not to obscure the drawings with details that will be readily apparent to those of ordinary skill in the art having the benefit of the description herein.

DETAILED DESCRIPTION

For the purpose of promoting an understanding of the principles of the inventive concepts, reference will now be made to embodiments illustrated in the drawings and their corresponding description. It will nevertheless be understood that no limitation of the scope of the inventive concepts is thereby intended, such alterations and further modifications in the illustrated system, and such further applications of the principles of the inventive concepts as illustrated therein being contemplated as would normally occur to one skilled in the art to which the inventive concepts relate.

It will be understood by those skilled in the art that the foregoing general description and the following detailed description are explanatory of the inventive concepts and are not intended to be restrictive thereof.

Reference throughout this specification to "an aspect", "another aspect" or similar language means that a particular feature, structure, or characteristic described in connection with the embodiment is included in at least one embodiment of the present inventive concepts. Thus, appearances of the phrase "in an embodiment", "in one or more embodiments", "in another embodiment", and similar language throughout this specification may, but do not necessarily, all refer to the same embodiment.

The terms "comprise", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components preceded by "comprises . . . a" does not, without more constraints, preclude the existence of other devices or other sub-systems or other elements or other structures or other components or additional devices or additional sub-systems or additional elements or additional structures or additional components.

Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or unless otherwise indicated.

As is traditional in the field, embodiments may be described and illustrated in terms of modules or engines that carry out a described function or functions. These modules or engines, which may be referred to herein as units or blocks or the like, or may include blocks or units, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Although the terms first, second, etc. may be used herein to describe various elements, these elements should not be limited by these terms. These terms are generally only used to distinguish one element from another.

Figure 11:
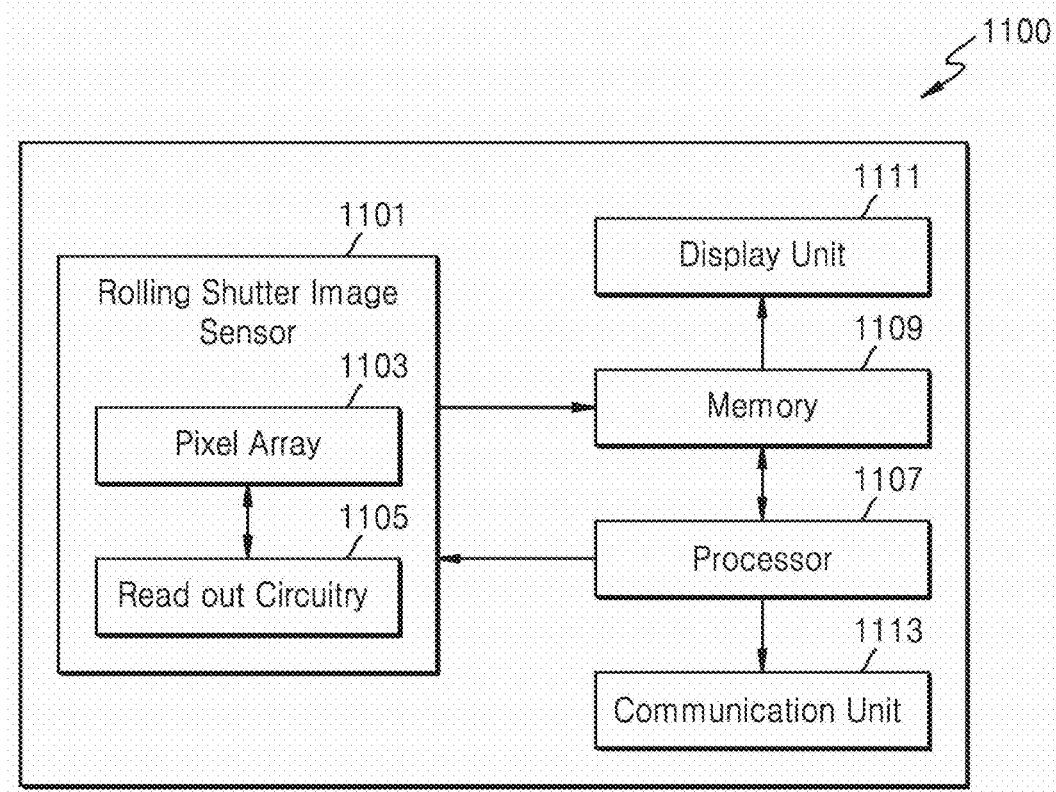
FIG. 11 illustrates a block diagram of a device for performing a readout of a pixel array, according to one or more embodiments disclosed herein.

FIG. 11 is a block diagram of a device 1100 for performing the readout of a pixel array 1103, according to one or more embodiments disclosed herein.

The device 1100 includes a rolling shutter image sensor 1101. The device 1100 may be a user device or a user's imaging device. The rolling shutter image sensor 1101 may include the pixel array 1103 and readout circuitry 1105.

The pixel array 1103 includes a plurality of pixels and a plurality of Floating Diffusion (FD) nodes. In the pixel array 1103, the plurality of pixels are arranged in a matrix. The plurality of pixels may be arranged in a Bayer pixel array or a Tetra pixel array. A set of pixels in the plurality of pixels shares a common FD node. A number of pixels sharing the common FD node may be based on the pixel array structure.

The readout circuitry 1105 may include a drive circuit and a control unit to perform pixel signal readout. The readout circuitry 1105 may include a signal processing circuit to perform Analog to Digital (ADC) conversion of the pixel signal. The readout circuitry 1105 may be configured to detect one of a first condition, a second condition, a third condition, or a fourth condition associated with the pixel array 1103 (i.e., detect whether one of these conditions is satisfied). The first condition indicates that an integration time associated with the readout of the pixel array 1103 is equal to a predefined threshold integration time. The second condition indicates that an Analog-to-Digital (ADC) conversion time associated with the readout of the pixel array 1103 supports simultaneous row access in the readout of the pixel array 1103, and a distance between a set of rows accessed in the simultaneous row access is variable. The third condition indicates that the readout of the pixel array 1103 supports simultaneous readout of first color pixels and second color pixels from different rows of the pixel array 1103. The fourth condition indicates that a plurality of rows of the pixel array 1103 are accessible at a predefined distance.

The readout circuitry 1105 may be further configured to select a first readout pattern upon the detection that the first condition is satisfied. The first readout pattern corresponds to a "converging readout architecture" for the readout of the pixel array 1103. The readout circuitry 1105 may be further configured to perform the readout of the pixel array 1103 based on the first readout pattern. A detailed explanation of the converging readout architecture will be described in forthcoming paragraphs with reference to FIG. 12 and FIG. 16.

Further, the readout circuitry 1105 may be configured to select a second readout pattern upon the detection that the second condition is satisfied. The second readout pattern corresponds to a "feed forward readout architecture" for the readout of the pixel array 1103. The readout circuitry 1105 may be further configured to perform the readout of the pixel array 1103 based on the second readout pattern. A detailed explanation of the feed forward readout architecture will be described in forthcoming paragraphs with reference to FIG. 13 and FIG. 17.

Further, the readout circuitry 1105 may be configured to select a third readout pattern upon the detection that the third condition is satisfied. The third readout pattern corresponds to a "color-asynchronous readout architecture" for the readout of the pixel array 1103. The readout circuitry 1105 may be further configured to perform the readout of the pixel array 1103 based on the third readout pattern. A detailed explanation of the color-asynchronous readout architecture will be described in forthcoming paragraphs with reference to FIG. 14 and FIG. 18.

Further, the readout circuitry 1105 may be configured to select a fourth readout pattern upon the detection that the fourth condition is satisfied. The fourth readout pattern corresponds to a "lateral jump readout architecture" for the readout of the pixel array 1103. The readout circuitry 1105 may be further configured to perform the readout of the pixel array 1103 based on the fourth readout pattern. A detailed explanation of the lateral jump readout architecture will be described in forthcoming paragraphs with reference to FIG. 15 and FIG. 19.

The device 1100 may further include a processor 1107, a memory 1109, a display unit 1111, and a communication unit 1113.

The processor 1107 can be a single processing unit or several units, all of which could include multiple computing units. The processor 1107 may be implemented as one or more microprocessors, microcomputers, microcontrollers, digital signal processors, central processing units, state machines, logic circuitries, and/or any devices that manipulate signals based on operational instructions. Among other capabilities, the processor 1107 is configured to fetch and execute computer-readable instructions and data stored in the memory 1109.

The memory unit 1109 corresponds to a memory that includes one or more computer-readable storage media. The memory may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) or cache.

The memory 1109 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

The display unit 1111 is configured to display the image captured using the rolling shutter image sensor 1101 at a display screen of the device 1100. As a non-limiting example, the display unit 1111 may be Light Emitting Diode (LED), Liquid Crystal Display (LCD), Organic Light Emitting Diode (OLED), Active Matrix Organic Light Emitting Diode (AMOLED), or Super Active Matrix Organic Light Emitting Diode (S-AMOLED) screen. The display unit 1111 may be of varied resolutions.

The communication unit 1113 is configured to communicate voice, video, audio, images, and/or any other data over a communication network (not shown). Further, the communication unit 1113 may include a communication port or a communication interface for sending and receiving notifications on the device 1100 via the communication network. The communication port or the communication interface may be a part of the processor 1107 or may be a separate component. The communication port may be created in software or may be a physical connection in hardware. The communication port may be configured to connect with the communication network, external media, the display unit 1111, or any other components in the device 1100, or combinations thereof. The connection with the communication network may be a physical connection, such as a wired Ethernet connection, or may be established wirelessly as discussed above. Likewise, the additional connections with other components of the device 1100 may be physical or may be established wirelessly.

Now a detailed description of the plurality of readout architectures will be described with reference to FIGS. 12 through 19.

Figure 12:
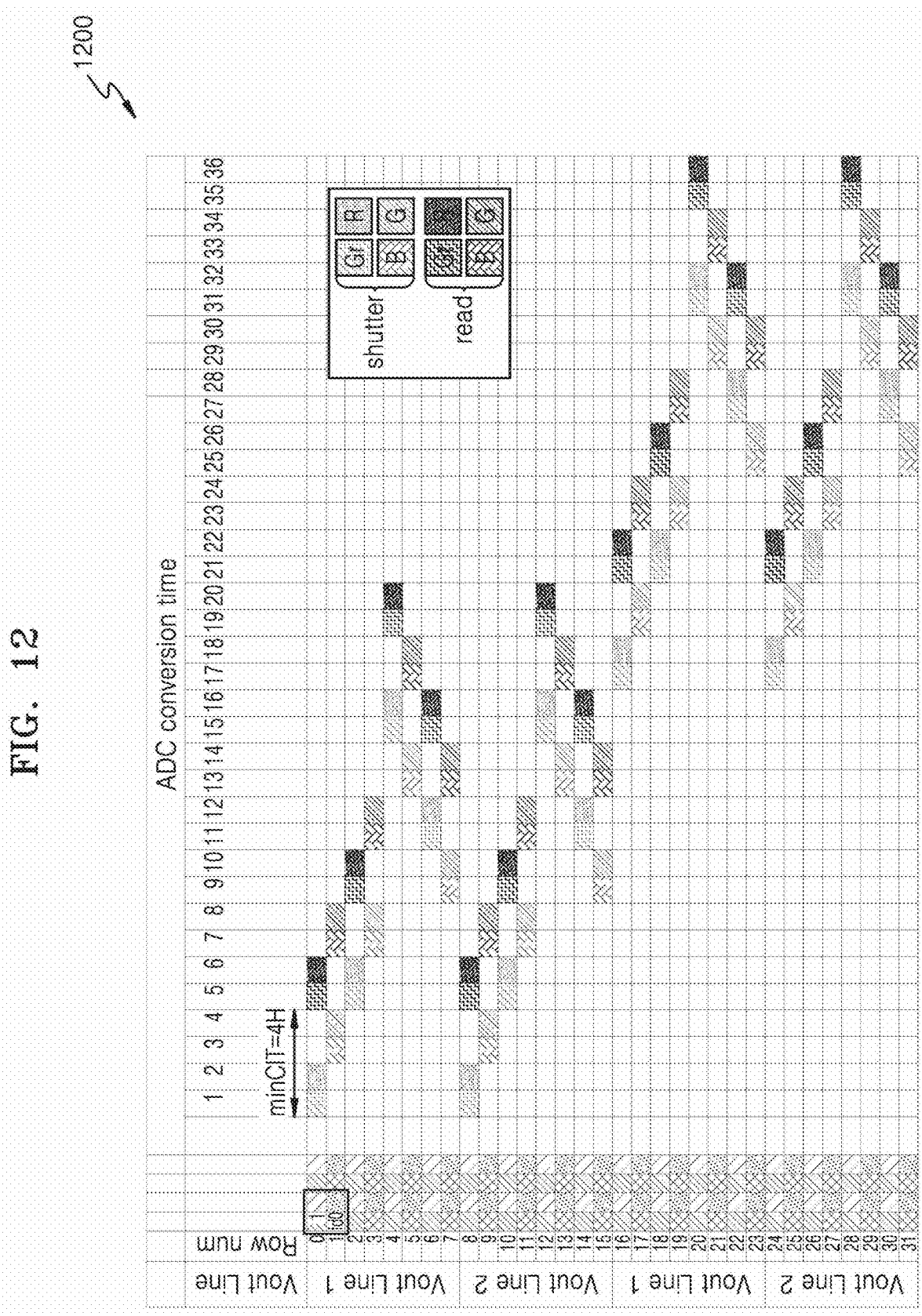
FIG. 12 illustrates a diagram depicting converging readout architecture, for the Bayer pixel array, according to one or more embodiments disclosed herein.

FIG. 12 illustrates a diagram 1200 depicting an example "converging readout architecture" for the Bayer pixel array, according to one or more embodiments disclosed herein.

Figure 16:
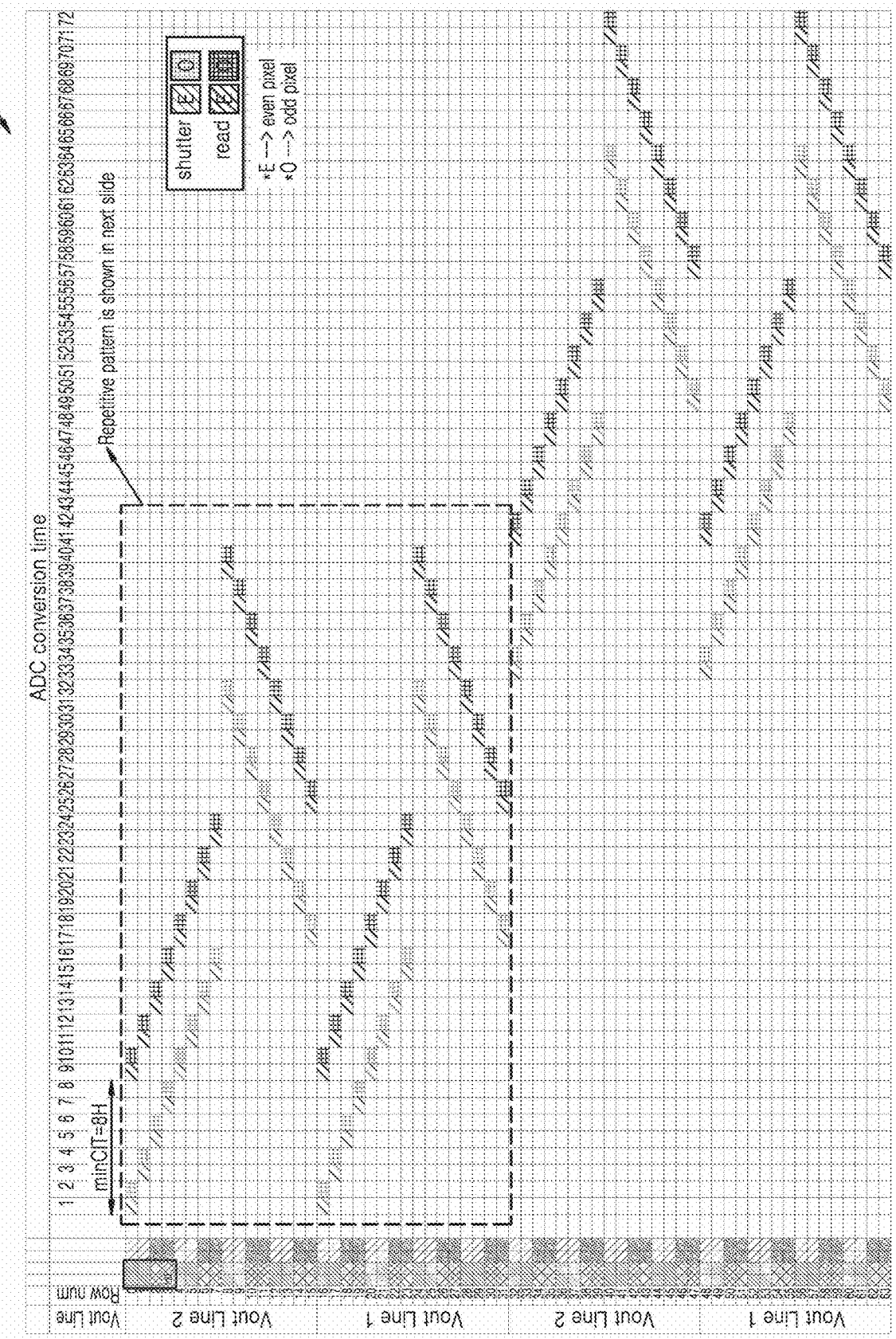
FIG. 16 illustrates a diagram depicting converging readout architecture, for the Tetra pixel array, according to one or more embodiments disclosed herein.

Also, FIG. 16 illustrates a diagram 1600 depicting an example converging readout architecture, for the Tetra pixel array, according to one or more embodiments disclosed herein. FIGS. 12 and 16 are explained in conjunction with each other for the sake of brevity.

The first readout pattern corresponds to the converging readout architecture. As illustrated in FIG. 12 and FIG. 16, in the converging readout architecture, the readout circuitry 1105 first reads each of the pixels within the pixel array 1103 that corresponds to a first set of FD nodes among the plurality of FD nodes in a monotonically increasing row order. (Herein, "reading a pixel" means reading the voltage output by the pixel on a Vout line connected to the pixel.) The first set of FD nodes may correspond to a first half of the FD nodes which share a common Vout line in the pixel array. Thereafter, the readout circuitry 1105 reads each of the pixels within the pixel array that correspond to a second set of FD nodes among the plurality of FD nodes in a monotonically decreasing row order. The second set of FD nodes may correspond to a second half of the FD nodes which share a common Vout line in the pixel array.

Figure 8:
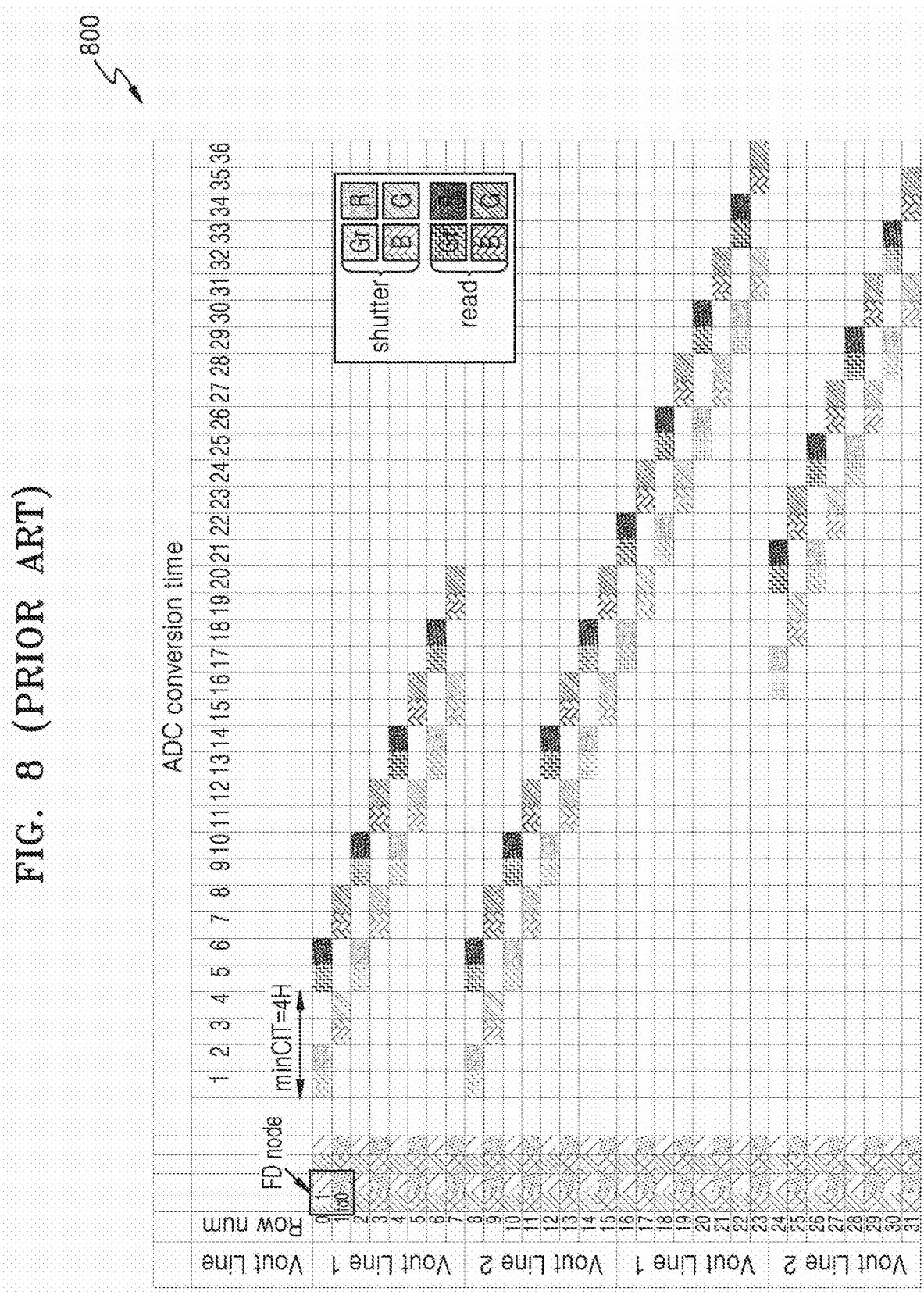
FIG. 8 illustrates a diagram depicting a conventional readout architecture, for Bayer pixel array, in 2RSR mode, in accordance with existing art.
Figure 9:
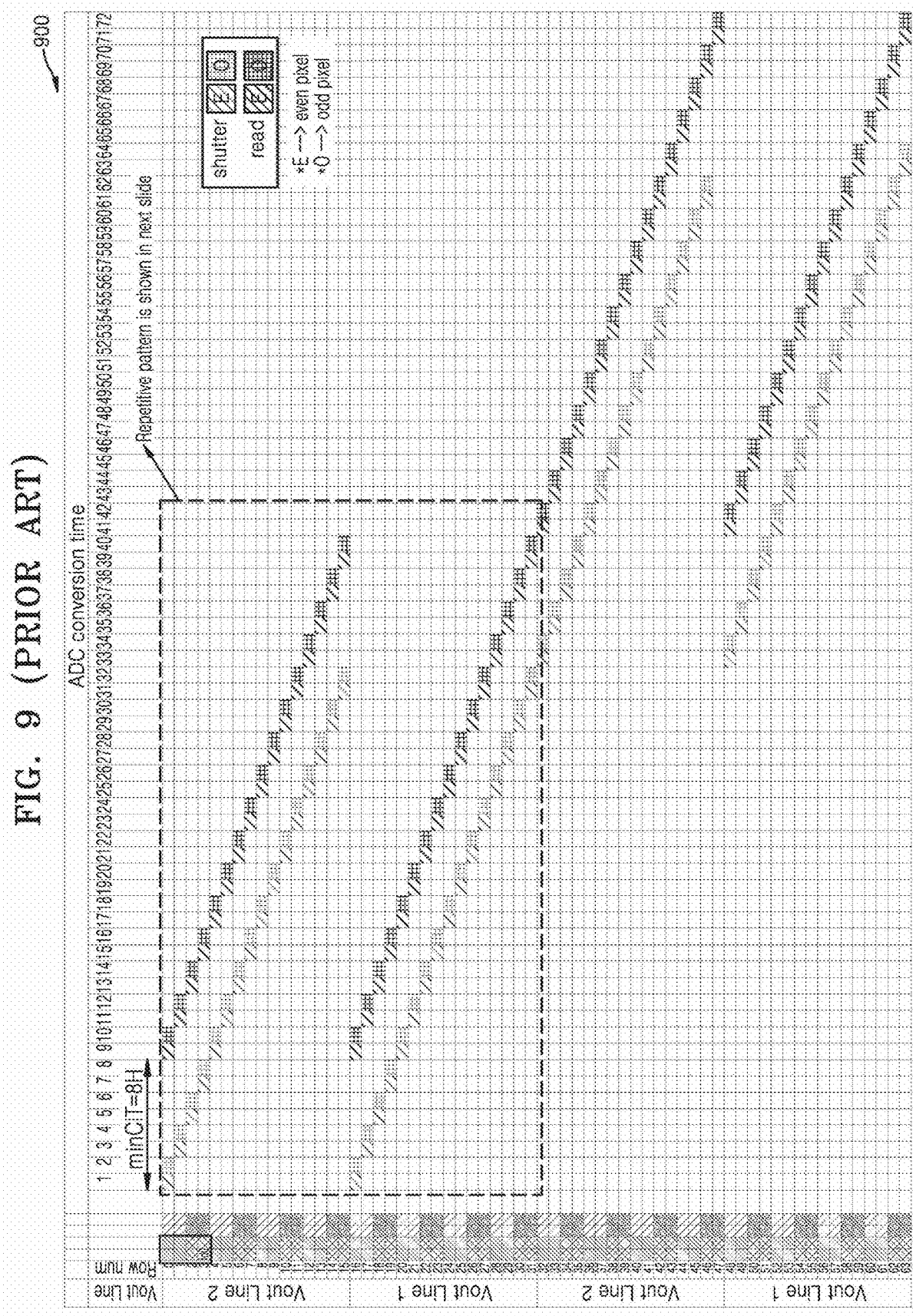
FIG. 9 illustrates a diagram depicting a conventional readout architecture, for Tetra pixel array, in 2RSR mode, in accordance with existing art.
Figure 10B:
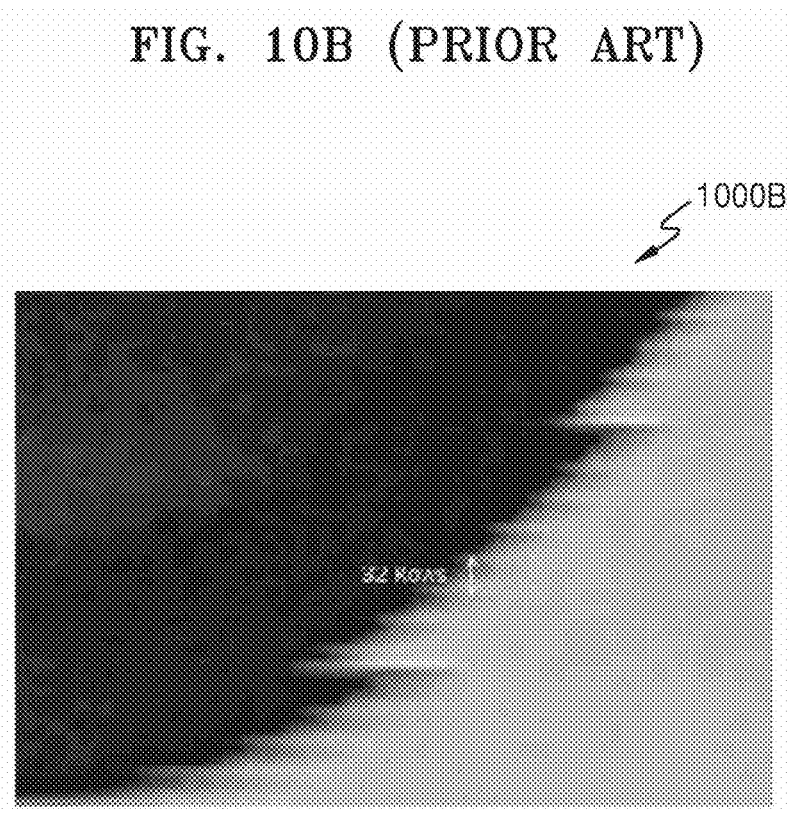

Therefore, when the first condition is detected, each of the pixels of the pixel array 1103 that correspond to the first half of the FD nodes and which share the common Vout line (Vout line 1) are read in monotonically increasing row order like a conventional readout. Thereafter, each of the pixels of the pixel array 1103 that correspond to the second half of the FD nodes and which share the common Vout line (Vout Line 1) are read in monotonically decreasing row order, unlike the conventional readout. Thus, in the illustrated example of FIG. 12 in which the upper eight rows #0 to #7 share Vout Line 1 and the next eight rows #8 to #15 share Vout Line 2, rows #0 and #8 are read together as in the conventional readout of FIG. 8. However, the maximum time between readout completion of adjacent rows is significantly improved in the embodiment of FIG. 12. In both FIG. 8 and FIG. 12, the completed readout of row #8 occurs at the end of ADC conversion time period #6. In the embodiment of FIG. 12, it is seen that readout of row #7 begins at the start of ADC conversion period #13 ("6H" later). In the conventional readout of FIG. 8, the readout of row #7 begins at the start of ADC conversion period #19 ("12H later"). Accordingly, considerable improvement is apparent with the converging readout architecture of the present inventive concept. Meanwhile, the examples provided for the number of rows in the groups herein are only to facilitate understanding of the concepts herein; any suitable number of grouped rows may be substituted in other embodiments.

In one or more embodiments, the first readout pattern is selected if the integration time associated with the readout of the pixel array 1103 equals or exceeds the predefined threshold integration time. The predefined threshold integration time corresponds to a minimum integration time associated with the readout of the pixel array. In general, the first readout pattern may be advantageous independent of the integration times being used, whenever the worst read row time difference is excessive and causes deleterious artifacts such as the Jello effect.

Further, unlike the conventional techniques that try to reduce the flicker effect and image stagnation, the converging readout architecture doesn't require access to additional dummy lines or additional ADC conversion time for dummy line shutter and read. Hence, the converging readout architecture has no impact on FPS and pixel array area.

The converging readout architecture may minimize the worst (longest) row read time difference between adjacent green pixel rows by half the time needed in the conventional readout. Hence, the converging readout architecture reduces the flicker effect significantly.

Further, in the converging readout architecture, all pixels that share a common floating diffusion (FD) node may be read sequentially as in conventional readout. In this case, the minimum integration time may be the smallest possible value for the FD node structure. This is advantageous over the conventional techniques which attempt to reduce the flicker effect, where the minimum integration time is much higher.

Figure 13:
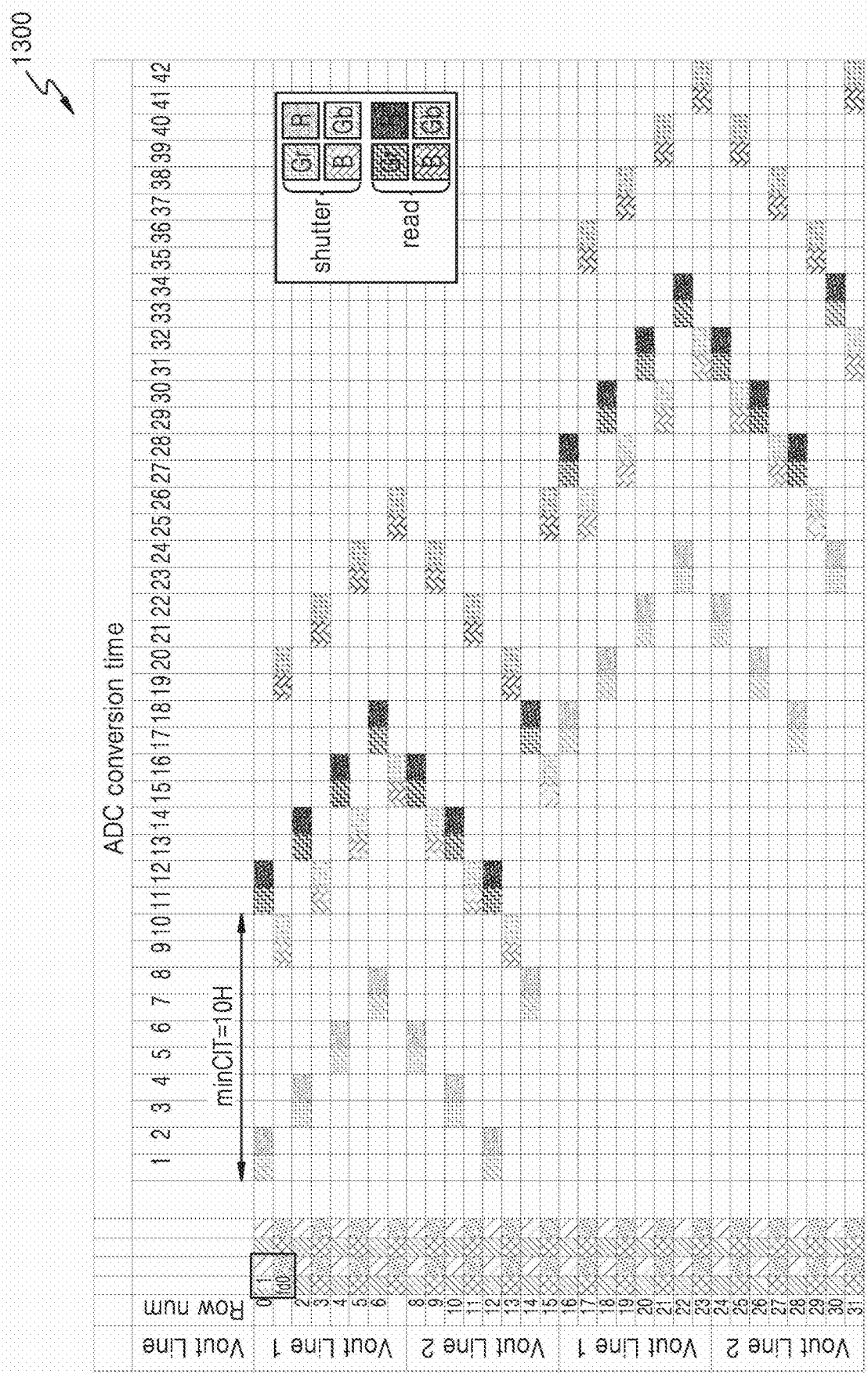
FIG. 13 illustrates a diagram depicting feed forward readout architecture, for the Bayer pixel array, according to one or more embodiments disclosed herein.
Figure 17:
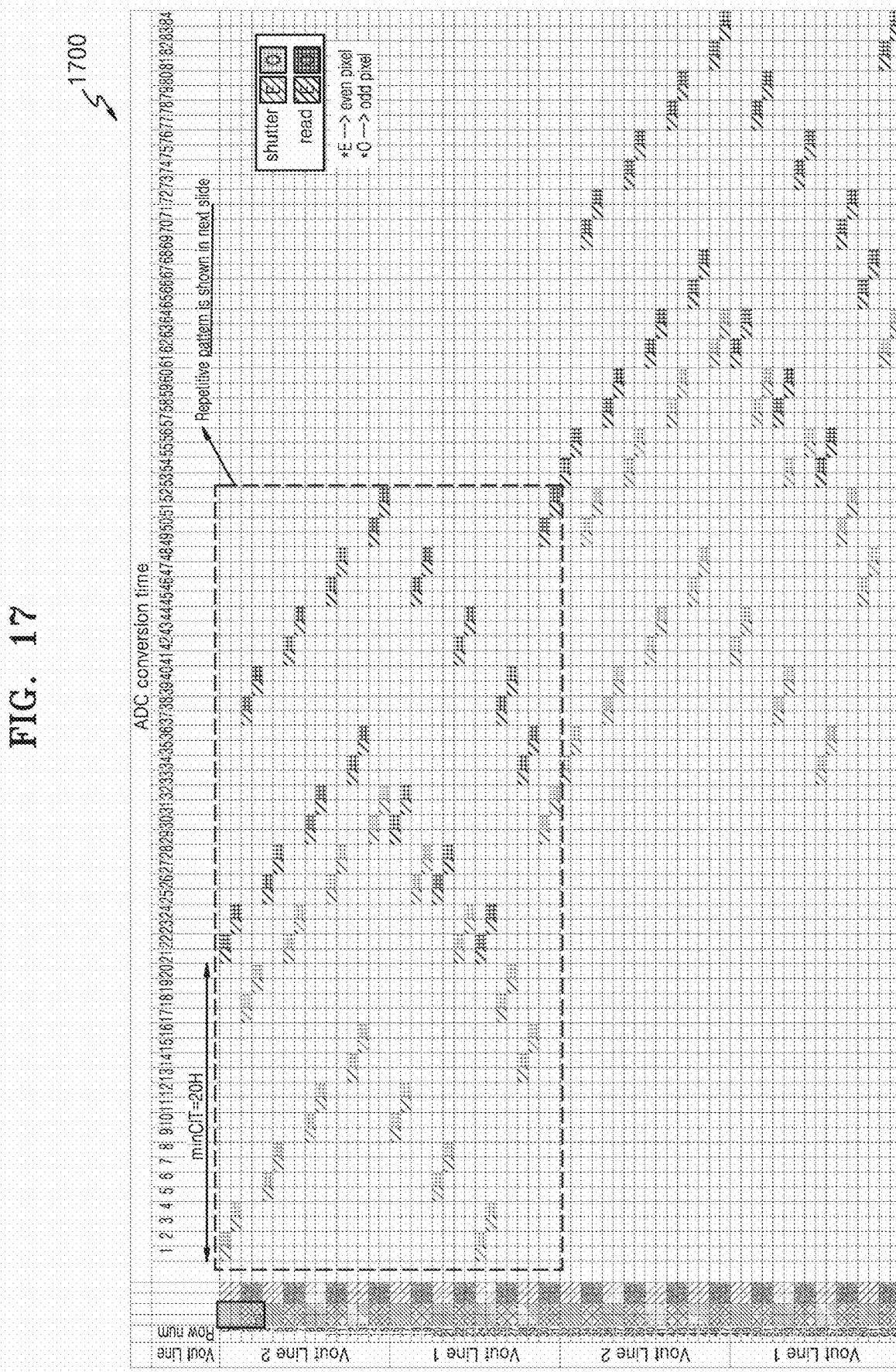
FIG. 17 illustrates a diagram depicting feed forward readout architecture, for the Tetra pixel array, according to one or more embodiments disclosed herein.

FIG. 13 illustrates a diagram 1300 depicting the feed forward readout architecture for the Bayer pixel array, according to one or more embodiments disclosed herein. FIG. 17 illustrates a diagram 1700 depicting the feed forward readout architecture for the Tetra pixel array, according to one or more embodiments disclosed herein. FIGS. 13 and 17 are explained in conjunction with each other for the sake of brevity. The second readout pattern corresponds to the feed forward readout architecture.

As illustrated in FIG. 13 and FIG. 17, in the feed forward readout architecture, the readout circuitry 1105 first reads a first set of pixels of the pixel array. The first set of pixels comprises a first subset of pixels within a first group of rows (e.g., Gr, R pixels of rows #0, #2, #4 and #6 in FIG. 13), and a second subset of pixels within a second group of rows (e.g., Gr, R pixels of rows #8, #10 and #12 in FIG. 13). The first subset of pixels is connected to Vout line1 and the second subset of pixels is connected to Vout line2. The first subset of pixels is read in a first row order direction ("first direction") and the second subset of pixels is read in a second row order direction ("second direction") opposite to the first direction. Here, a direction of increasing row numbers is opposite to a second direction of decreasing row numbers. When the first direction is a direction of increasing row numbers, the second direction is a direction of decreasing row numbers, and vice versa. In the example of FIG. 13, the first subset of pixels is read in an increasing row direction (during ADC Conversion time slots #11-18) and the second subset of pixels is read in a decreasing row direction (during ADC Conversion time periods #11-16).

Further, the readout circuitry 1105 reads a second set of pixels of the pixel array 1103, where the second set of pixels comprises a third subset of pixels of a third set of rows (e.g., B, Gb pixels of row #1, #3, #5 and #7 in FIG. 13) and a fourth subset of pixels in a fourth set of rows (e.g., B, Gb pixels of row #9, #11 and #13). The third and fourth subsets of pixels are read in opposite respective directions. (Gr denotes a green photosite pixel in a red row, and Gb denotes a green photosite pixel in a blue row of a Bayer or Tetra pixel array.)

The first set of pixels is read in a first phase of the readout and the second set of pixels is read in a second phase of the readout subsequent to the first phase. As noted, the first set of pixels may correspond to pixels of Green, Red (Gr, R) rows and the second set of pixels may correspond to the pixels of Blue, Green (B, Gb) rows.

Therefore, when the second condition is detected, the readout circuitry 1105 reads each of the pixels of the pixel array 1103 corresponding to the Gr, R rows connected to different Vout lines in opposite respective directions in the first phase, and each of pixels of the pixel array 1103 corresponding to the B, Gb rows connected to different Vout lines in opposite respective directions in the second phase. For example, as shown in FIG. 13, a first row direction is an increasing row order direction, from the upper row (row #0) towards the lower row (row #31); and a second row direction opposite to the first row direction is a decreasing row order direction, from the lower row towards the upper row. In the first phase, the readout circuitry 1105 sequentially reads a first set of pixels, which may be the Gr, R pixels of row #0, #2, #4 and #6, i.e., in the first direction, which pixels each output a voltage onto Vout Line1. Concurrently in the first phase, when the Gr, R pixels of the first subset of pixels of rows #0, #2 and #4 are sequentially read, the Gr, R pixels of row #12, #10 and #8 are sequentially read and output respective voltages onto Vout Line2. Note that during the ADC Conversion time periods #17-18, the Gr, R pixels of rows #6 and #14 are concurrently read. Thus, in this example, the first subset of pixels (read in a first direction) comprises pixels of four rows but the second subset of pixels (read in a second, opposite direction) comprises pixels of three rows. Analogous reading sequences are apparent in the second phase for the B, Gb pixels, as illustrated in FIGS. 13 and 17.

Therefore, the read time differences between adjacent green pixel rows are spread in the feed forward readout architecture, leading to the outline of moving objects appearing more gradually.

In the feed forward readout architecture, for a 2×4 shared floating diffusion node, the pixels in the shared node are not read consecutively, unlike conventional techniques where the pixels are read consecutively.

Further, unlike the conventional techniques that try to reduce the flicker effect/image stagnation, the feed forward readout architecture doesn't require access to additional dummy lines or additional ADC conversion time for dummy line shutter and read (dummy limes may be omitted). Hence, the feed forward readout architecture achieves better performance than state of the art schemes, without any impact on FPS and pixel array area.

The feed forward readout architecture is targeted to minimize the worst row access time difference between adjacent green pixel rows up to a predefined ADC conversion time, thereby mitigating the effects of image stagnation. In a non-limiting example, the predefined ADC conversion time may correspond to 10 ADC ("10H") conversion time.

Figure 14:
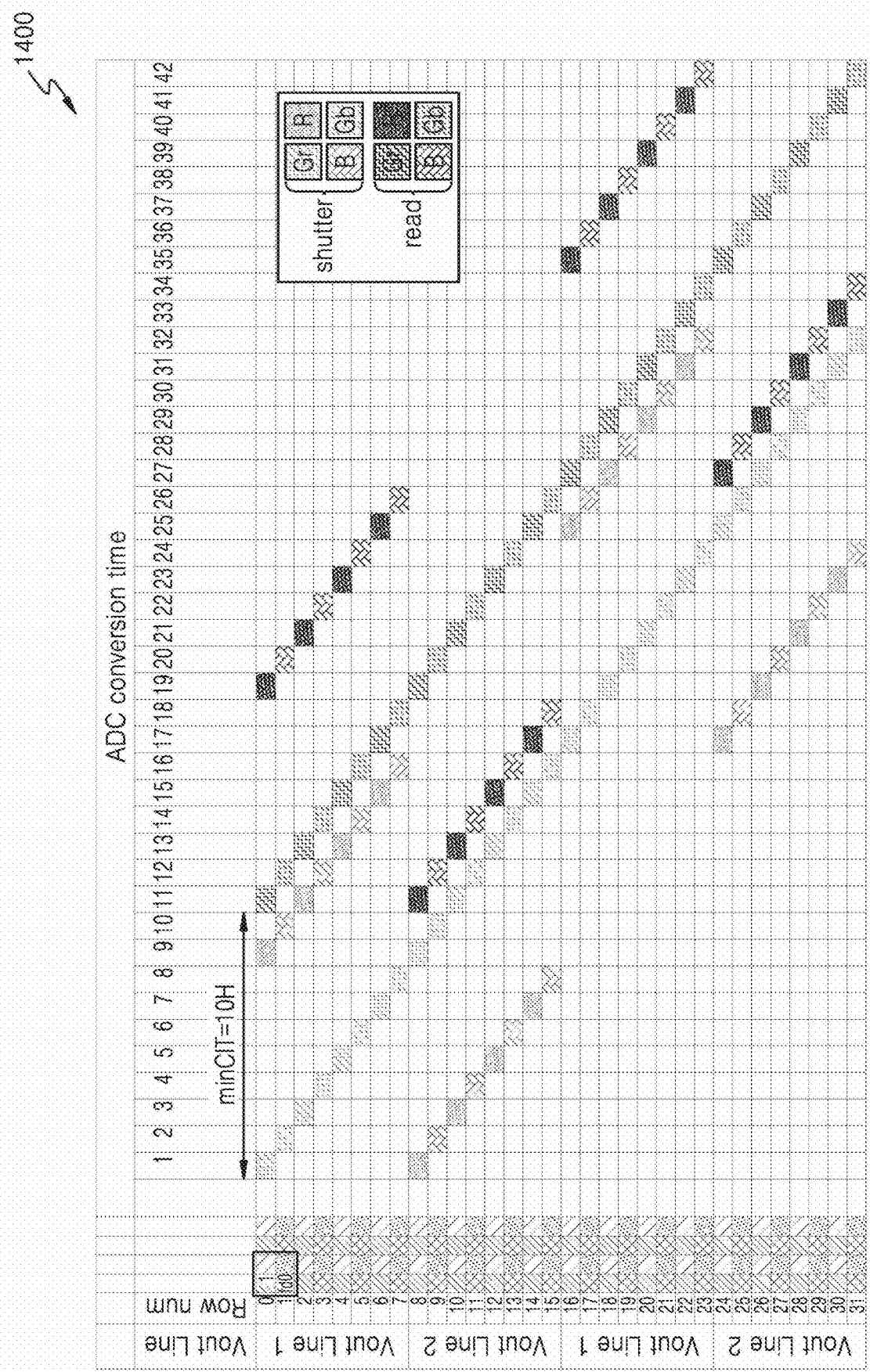
FIG. 14 illustrates a diagram depicting color asynchronous readout architecture, for the Bayer pixel array, according to one or more embodiments disclosed herein.
Figure 18:
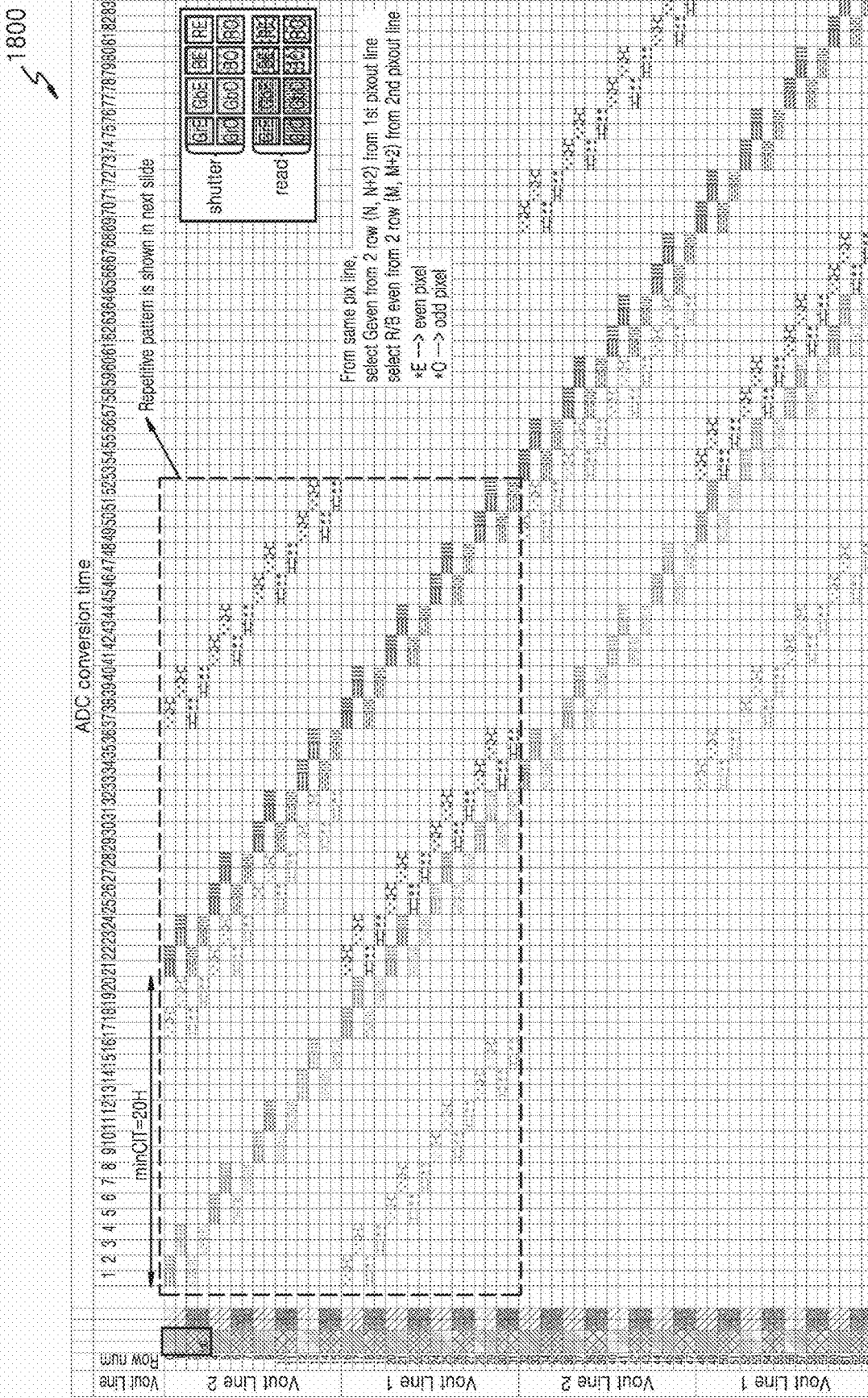
FIG. 18 illustrates a diagram depicting color asynchronous readout architecture, for the Tetra pixel array, according to one or more embodiments disclosed herein.

FIG. 14 illustrates a diagram 1400 depicting the color asynchronous readout architecture, for the Bayer pixel array, according to one or more embodiments disclosed herein. FIG. 18 illustrates a diagram 1800 depicting the color asynchronous readout architecture, for the Tetra pixel array, according to one or more embodiments disclosed herein. FIGS. 14 and 18 are explained in conjunction with each other for the sake of brevity.

The third readout pattern corresponds to the color-asynchronous readout architecture. As illustrated in FIG. 14 and FIG. 18, in the color-asynchronous readout architecture, the readout circuitry 1105 reads, at each readout time instance of the readout of the pixel array, the first color pixels from a first Vout line (first output line) and the second color pixels from a second, different Vout line (second output line). The first color pixels and the second color pixels are pixels from different rows of the pixel array.

In a non-limiting example, the first color pixels correspond to Green (Gr/Gb) pixels and the second color pixels correspond to one of Red (R) or Blue (B) pixels. In a non-limiting example, the readout circuitry 1105 may monotonically read pixels at successive vertical addresses of Green (Gr/Gb) pixels in the pixel array. In other words, green pixels of consecutive rows are monotonically read during successive ADC Conversion time periods. For instance, as seen in FIG. 14, during successive ADC Conversion time periods #11 to #42, green pixels of row #0 to row #31 are correspondingly read in a row-by-row sequence of Gr, Gb, Gr, Gb, . . . . Gr, Gb.

The color-asynchronous readout architecture eliminates the undesired effects of image stagnation and/or flicker by always reading different colored pixels from different Vout lines at any given instance of time.

Further, the color-asynchronous readout architecture has an added advantage in that the readout vertical address of Gr/Gb pixels is always monotonic. Since Gr/Gb pixels are considered reference pixels for luminance, the readout technique of this embodiment may eliminate image stagnation further.

Further, unlike the conventional techniques that try to reduce the flicker effect and image stagnation, the color-asynchronous readout architecture doesn't require access to additional dummy lines or additional ADC conversion time for dummy line shutter and read. Hence, the color-asynchronous readout architecture achieves comparable performance as the conventional techniques, without any impact on FPS and pixel array area.

Further, for non-Bayer pixel array arrangement, the color-asynchronous readout architecture spreads the read of each row pixel over multiple ADC conversion time slots. This provides the additional benefit of improved Horizontal Fixed Pattern Noise (HFPN) and Horizontal Noise (HN).

The color-asynchronous readout architecture is targeted to minimize the worst row access time difference between adjacent green pixel rows up to the predefined ADC conversion time. In a non-limiting example, the predefined ADC conversion time may correspond to 10 ADC conversion time periods (10H). Hence the color-asynchronous readout architecture eliminates the undesired effects of image stagnation and/or flicker.

Figure 15:
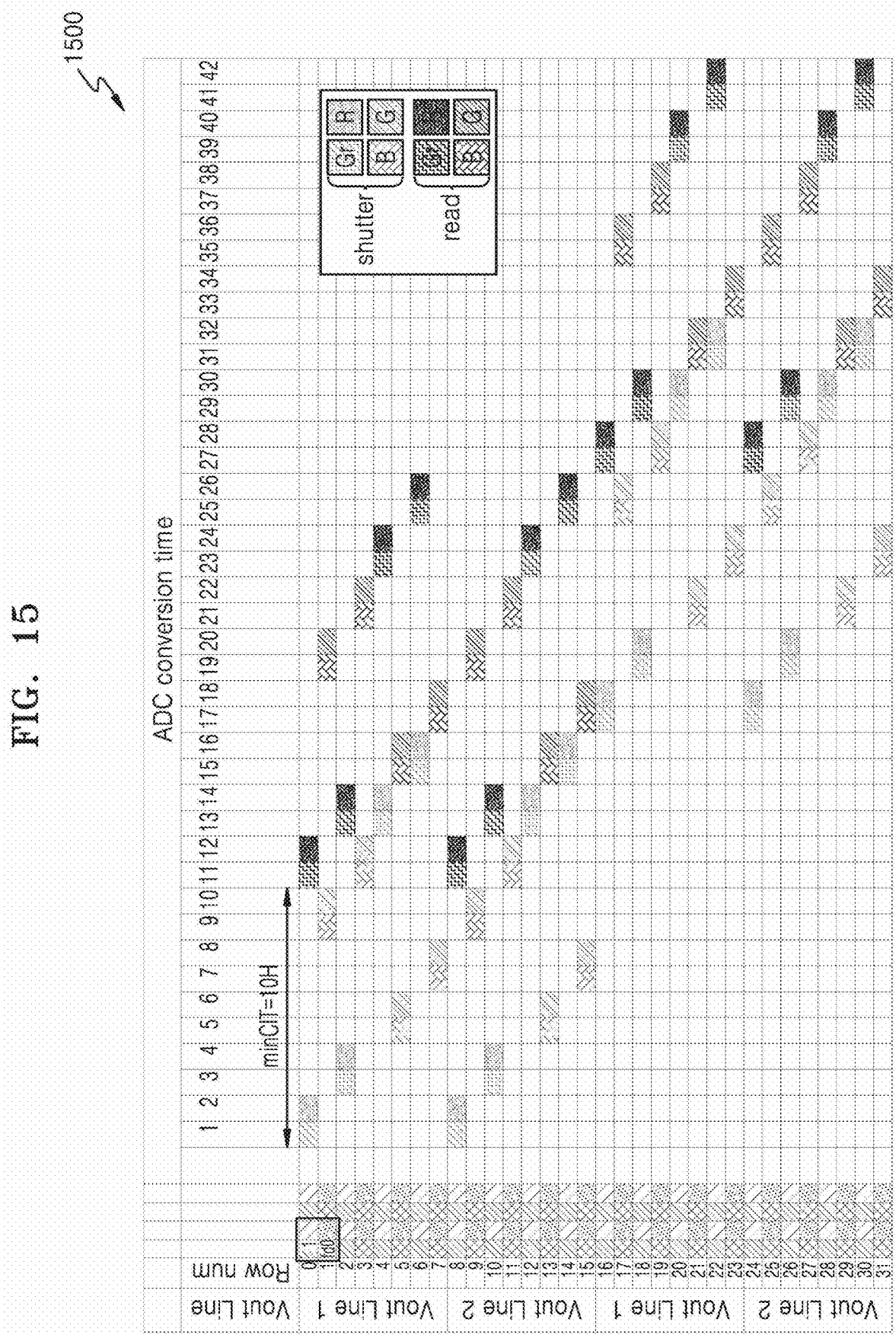
FIG. 15 illustrates a diagram depicting lateral jump readout architecture, for the Bayer pixel array, according to one or more embodiments disclosed herein.
Figure 19:
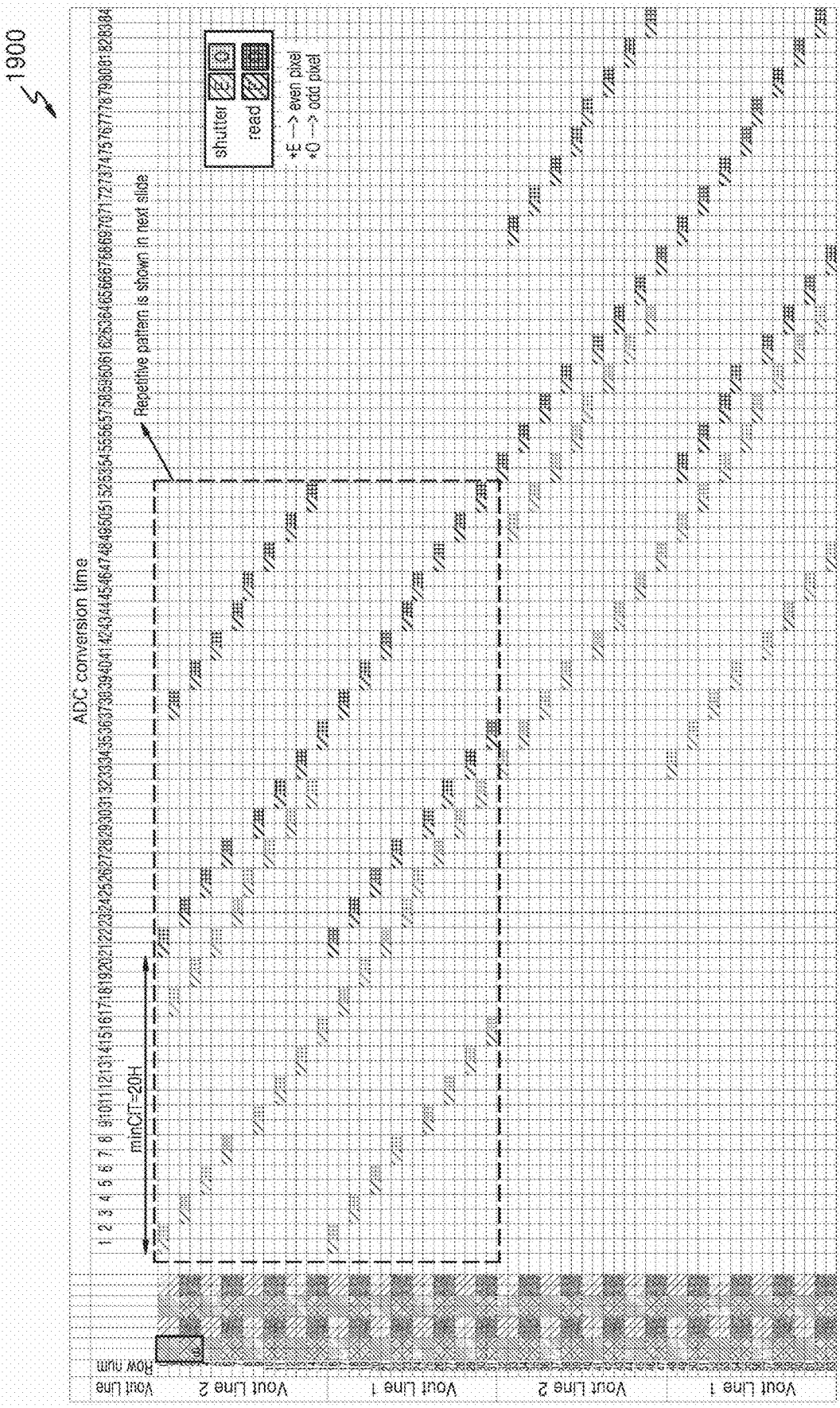
FIG. 19 illustrates a diagram depicting lateral jump readout architecture, for the Tetra pixel array, according to one or more embodiments disclosed herein.

FIG. 15 illustrates a diagram 1500 depicting the lateral jump readout architecture for the Bayer pixel array, according to one or more embodiments disclosed herein. FIG. 19 illustrates a diagram 1900 depicting the lateral jump readout architecture for the Tetra pixel array, according to one or more embodiments disclosed herein. FIGS. 15 and 19 are explained in conjunction with each other for the sake of brevity.

The fourth readout pattern corresponds to the lateral jump readout architecture. As illustrated in FIG. 15 and FIG. 19, in the lateral jump readout architecture, the readout circuitry 1105 reads, for each of a plurality of Vout lines (output lines), each of the pixels of the pixel array 1103 corresponding to a first set of even rows of the plurality of rows. The readout circuitry 1105 further reads, for each of the plurality of Vout lines, each of the pixels of the pixel array corresponding to a first set of odd rows. Further, the readout circuitry 1105 reads, for each of the plurality of Vout lines, each of the pixels of the plurality of pixels corresponding to a second set of odd rows. Further, the readout circuitry 1105 reads, for each of the plurality of Vout lines, each of the pixels of the pixel array corresponding to a second set of even rows.

In one or more embodiments, if N consecutive rows are shared by (i.e., commonly connected to) each Vout line, the lateral jump readout architecture reads pixel rows in the following fashion.

In the first set of N/2 rows, even rows are accessed (0<=2n<N/2, n=0, 1, 2, 3 . . . ),
In the second set of N/2 rows, odd rows are accessed (N/2<=2n+1<N, n=N/4, N/4+1, . . . ),
In the first set of N/2 rows, odd rows are accessed (0<=2n+1<N/2, n=0, 1, 2, 3 . . . ), and
In the second set of N/2 rows, even rows are accessed (N/2<=2n<N, n=N/4, N/4+1, . . . ).

Therefore, when the fourth condition is detected, the readout circuitry 1105 reads each of the pixels corresponding to the even rows from a first half of the rows followed by each of the pixels corresponding to the odd rows from a second half of the rows, and subsequently each of the pixels corresponding to the odd rows from the first half of the rows followed by each of the pixels corresponding to the even rows from the second half of the rows. The first half of the rows and the second half of the rows have shared FD nodes.

In the lateral jump readout architecture, the row access time differences between adjacent green pixel rows are spread, which makes the visual outline of moving objects more gradual.

Further, in the lateral jump readout architecture, for a 2×4 shared Floating Diffusion node, the pixels in the shared node are not read consecutively, unlike the conventional techniques where the pixels are read continuously.

Unlike the conventional techniques that try to reduce the flicker effect/image stagnation, the lateral jump readout architecture doesn't require access to additional dummy lines (dummy lines may be omitted) or additional ADC conversion time for the dummy line shutter and read. Hence, lateral jump readout architecture achieves comparable performance as in the conventional techniques, without any impact on FPS and pixel array area.

The lateral jump readout architecture may be targeted to minimize the worst row access time difference between adjacent green pixel rows up to the predefined ADC conversion time, thereby mitigating the effects of image stagnation. In a non-limiting example, the predefined ADC conversion time may correspond to 10 ADC conversion time periods (10H).

FIG. 20 illustrates a flow chart of a method 2000 of performing readout of the pixel array 1103 in the rolling shutter image sensor 1101, according to one or more embodiments disclosed herein. The method 2000 includes a series of operations 2001 through 2007 performed by the device 1100.

At operation 2001, image capturing is initiated using the rolling shutter image sensor. At operation 2003, the readout circuitry 1105 in the rolling shutter image sensor detects one of first through fourth conditions associated with the pixel array 1103.

At operation 2005, when the first condition is detected, the readout circuitry 1105 reads, in the pixel array 1103, pixels corresponding to the first half of FD nodes sharing the common Vout line in the monotonically increasing row order, and pixels corresponding to the second half of the FD nodes sharing the common Vout line in the monotonically decreasing row order. The first condition may be detected when the integration time associated with the readout of the pixel array 1103 equals or exceeds the predefined threshold integration time.

At operation 2007, when the second condition is detected, the readout circuitry 1105 reads, in the pixel array 1103, pixels corresponding to the Gr, R rows and connected to different Vout lines in opposite respective directions in the first phase, and pixels corresponding to the B, Gb rows and connected to different Vout lines in opposite respective directions in the second phase. The second condition may be detected when the ADC conversion time associated with the readout of the pixel array 1103 supports simultaneous row access in the readout of the pixel array, and a distance between a set of rows accessed in the simultaneous row access is variable.

At operation 2009, when the third condition is detected, the readout circuitry 1105 reads, in the pixel array 1103, the first color pixels from the first Vout line and the second color pixels from the second Vout line at each readout time instance of the readout of the pixel array 1103. The first color pixels correspond to the Gr/Gb pixels and the second color pixels correspond to one of the R or B pixels. The third condition is detected when the readout of the pixel array 1103 supports simultaneous readout of first color pixels and second color pixels from different rows of the pixel array.

At operation 2011, when the fourth condition is detected, the readout circuitry 1105 reads, in the pixel array 1103, pixels corresponding to the even rows from the first half of the rows followed by pixels corresponding to the odd rows from the second half of the rows, and subsequently pixels corresponding to the odd rows from the first half of the rows followed by pixels corresponding to the even rows from the second half of the rows. The first half of the rows and the second half of the rows have shared FD nodes. The fourth condition may be detected when the plurality of rows of the pixel array 1103 is accessible at the predefined distance.

Embodiments of readout techniques as taught herein may eliminate the flicker effect/image stagnation without the requirement of additional dummy line readout from the pixel array. Hence, pixel array size increase and impact on FPS may both be mitigated. All the proposed readout techniques may be deployed in a single product using configurable settings.

Unless otherwise defined, all technical and scientific terms used herein have the same meaning as commonly understood by one ordinary skilled in the art to which this disclosure belongs. The system, methods, and examples provided herein are illustrative only and not intended to be limiting.

While specific language has been used to describe the present subject matter, any limitations arising on account thereto, are not intended. As would be apparent to a person in the art, various working modifications may be made to the method to implement the inventive concept as taught herein. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of exemplary embodiments, those skilled in the art will recognize that the embodiments herein can be practiced with modification within the scope of the embodiments as described herein.

We claim:

1. A method of performing readout of a pixel array in a rolling shutter image sensor, the method comprising:

detecting one of a first condition, a second condition, a third condition, or a fourth condition associated with the pixel array;

reading, in the pixel array when the first condition is detected, pixels corresponding to a first half of floating diffusion (FD) nodes sharing a common Vout line in monotonically increasing row order, and pixels corresponding to a second half of the FD nodes sharing the common Vout line in monotonically decreasing row order;

reading, in the pixel array when the second condition is detected, pixels corresponding to Green, Red (Gr, R) rows connected to different Vout lines in opposite respective directions in a first phase, and pixels corresponding to Blue, Green (B, Gb) rows shared by different Vout lines in opposite respective directions in a second phase;

reading, in the pixel array when the third condition is detected, first color pixels from a first Vout line and second color pixels from a second Vout line at each readout time instance of the readout of the pixel array; and reading, in the pixel array when the fourth condition is detected, pixels corresponding to even rows from a first half of the rows followed by pixels corresponding to odd rows from a second half of the rows, and subsequently pixels corresponding to the odd rows from the first half of the rows followed by pixels corresponding to the even rows from the second half of the rows, wherein the first half of the rows and the second half of the rows have shared FD nodes.

2. The method of claim 1, wherein the first condition indicates that an integration time associated with the readout of the pixel array equals or exceeds a predefined threshold integration time.

3. The method of claim 2, wherein the predefined threshold integration time corresponds to a minimum integration time associated with the readout of the pixel array.

4. The method of claim 1, wherein the second condition indicates that an Analog-to-Digital (ADC) conversion time associated with the readout of the pixel array supports simultaneous row access in the readout of the pixel array, and a distance between a set of rows accessed in the simultaneous row access is variable.

5. The method of claim 1, wherein the third condition indicates that the readout of the pixel array supports simultaneous readout of the first color pixels and the second color pixels from different rows of the pixel array.

6. The method of claim 1, wherein the fourth condition indicates that a plurality of rows of the pixel array is accessible at a predefined distance.

7. The method of claim 1, wherein the first color pixels correspond to Green (Gr/Gb) pixels and the second color pixels correspond to one of Red (R) or Blue (B) pixels.

8. The method of claim 7, further comprising monotonically reading pixels at successive vertical addresses of the Green (Gr/Gb) pixels in the pixel array.

9. A device comprising:
a rolling shutter image sensor that includes:
a pixel array; and
readout circuitry configured to:
detect one of a first condition, a second condition, a third condition, or a fourth condition associated with the pixel array;
read, in the pixel array when the first condition is detected, pixels corresponding to a first half of Floating Diffusion (FD) nodes sharing a common Vout line in monotonically increasing row order, and pixels corresponding to a second half of the FD nodes sharing the common Vout line in monotonically decreasing row order;

read, in the pixel array when the second condition is detected, pixels corresponding to Green, Red (Gr, R) rows and connected to different Vout lines in opposite respective directions in a first phase, and pixels corresponding to Blue, Green (B, Gb) rows and connected to different Vout lines in opposite respective directions in a second phase;

read, in the pixel array when the third condition is detected, first color pixels from a first Vout line and second color pixels from a second Vout line at each readout time instance of the readout of the pixel array; and read, in the pixel array when the fourth condition is detected, pixels corresponding to even rows from a first half of the rows followed by pixels corresponding to odd rows from a second half of the rows, and subsequently pixels corresponding to the odd rows from the first half of the rows followed by pixels corresponding to the even rows from the second half of the rows, wherein the first half of the rows and the second half of the rows have shared FD nodes.

10. The device of claim 9, wherein the first condition indicates that an integration time associated with the readout of the pixel array is equal to a predefined threshold integration time.

11. The device of claim 10, wherein the predefined threshold integration time corresponds to a minimum integration time associated with the readout of the pixel array.

12. The device of claim 9, wherein the second condition indicates that an Analog-to-Digital (ADC) conversion time associated with the readout of the pixel array supports simultaneous row access in the readout of the pixel array, and a distance between a set of rows accessed in the simultaneous row access is variable.

13. The device of claim 9, wherein the third condition indicates that the readout of the pixel array supports simultaneous readout of the first color pixels and the second color pixels from different rows of the pixel array.

14. The device of claim 9, wherein the fourth condition indicates that a plurality of rows of the pixel array is accessible at a predefined distance.

15. The device of claim 9, wherein the first color pixels correspond to Green (Gr/Gb) pixels and the second color pixels correspond to one of Red (R) or Blue (B) pixels.

16. The device of claim 15, wherein the circuitry is further configured to monotonically read pixels at successive vertical addresses of the Green (Gr/Gb) pixels in the pixel array.

* * * * *